United States Patent
Touge et al.

(10) Patent No.: US 7,532,151 B2
(45) Date of Patent: May 12, 2009

(54) PROXIMITY SENSOR

(75) Inventors: Hiroshi Touge, Ichinomiya (JP); Takehiko Sugiura, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 438 days.

(21) Appl. No.: 10/575,987

(22) PCT Filed: Oct. 15, 2004

(86) PCT No.: PCT/JP2004/015281

§ 371 (c)(1),
(2), (4) Date: Apr. 17, 2006

(87) PCT Pub. No.: WO2005/038483

PCT Pub. Date: Apr. 28, 2005

(65) Prior Publication Data

US 2007/0194878 A1   Aug. 23, 2007

(30) Foreign Application Priority Data

| Oct. 17, 2003 | (JP) | 2003-358227 |
| Oct. 17, 2003 | (JP) | 2003-358228 |
| Oct. 23, 2003 | (JP) | 2003-363422 |
| Oct. 30, 2003 | (JP) | 2003-370556 |

(51) Int. Cl.
    *G01S 13/32* (2006.01)
(52) U.S. Cl. ......................................... 342/27
(58) Field of Classification Search .................. 342/27, 342/28
    See application file for complete search history.

(56) References Cited

U.S. PATENT DOCUMENTS

| 4,120,389 | A  | * | 10/1978 | Erickson ...................... 342/27 |
| 5,227,667 | A  |   | 7/1993  | Takinami et al. |
| 5,361,070 | A  |   | 11/1994 | McEwan |
| 6,281,599 | B1 |   | 8/2001  | Murakami et al. |
| 2003/0160701 | A1 | * | 8/2003 | Nakamura et al. ....... 340/686.6 |

(Continued)

FOREIGN PATENT DOCUMENTS

EP           1693684 A1  *  8/2006

(Continued)

OTHER PUBLICATIONS

Official Action (Notice of Reasons of Rejection) issued by the Japanese Patent Office in priority application No. JP 2003-358227, Jul. 17, 2007; and English translation thereof.

(Continued)

*Primary Examiner*—Dan Pihulic
(74) *Attorney, Agent, or Firm*—Buchanan Ingersoll & Rooney PC

(57) ABSTRACT

A microwave oscillating portion 30 has an output oscillator function that is capable of adjusting automatically a frequency of microwaves radiated from an electrically conductive member made of an outer panel 11-14 as an antenna at a specific frequency of a sufficiently short wavelength in relation to a size of the electrically conductive member made of the outer panel 11-14. The microwave oscillating portion 30 can detect a human and an object of a detection object 27 in a detection area 11A-14A set at an outside of the outer panel 11-14 that is integrally or separably mounted on a vehicle 1.

11 Claims, 9 Drawing Sheets

31 Detection Object

U.S. PATENT DOCUMENTS

| | | | |
|---|---|---|---|
| 2007/0146209 A1* | 6/2007 | Touge et al. | 343/702 |
| 2007/0194878 A1* | 8/2007 | Touge et al. | 340/5.2 |

FOREIGN PATENT DOCUMENTS

| | | |
|---|---|---|
| JP | S53-118996 | 10/1978 |
| JP | 2-276308 | 11/1990 |
| JP | 8-511341 | 11/1996 |
| JP | 09-188206 A | 7/1997 |
| JP | 11-205116 A | 7/1999 |
| JP | 11-231065 A | 8/1999 |
| JP | 2000-017916 A | 1/2000 |
| JP | 2000-031808 A | 1/2000 |
| JP | 2001-4741 | 1/2001 |
| JP | 2001-55852 | 2/2001 |
| JP | 2002-277558 | 9/2002 |
| JP | 2002-277558 A | 9/2002 |
| JP | 2002-296344 | 10/2002 |
| JP | 2002-296344 A | 10/2002 |
| JP | 2002-342031 A | 11/2002 |
| JP | 2003-21677 | 1/2003 |
| JP | 2003-036484 A | 2/2003 |
| JP | 2003-107168 | 4/2003 |
| JP | 2003-279643 | 10/2003 |
| WO | WO 92/24579 A1 | 10/1994 |
| WO | WO 94/24579 A1 | 10/1994 |
| WO | WO 2005038483 A1 * | 4/2005 |

OTHER PUBLICATIONS

Official Action (Notice of Reasons of Rejection) issued by the Japanese Patent Office in priority application No. JP 2003-358228, Jul. 17, 2007; and English translation thereof.

Official Action (Notice of Reasons of Rejection) issued by the Japanese Patent Office in priority application No. JP 2003-363422, Jul. 17, 2007; and English translation thereof.

Official Action (Notice of Reasons of Rejection) issued by the Japanese Patent Office in priority application No. JP 2003-370556, Jul. 17, 2007; and English translation thereof.

Official Action issued by the Korean Intellectual Property Office in corresponding Korean Patent Application No. 10-2006-7006870.

English-language(Brief) translation of Official Action issued by the Korean Intellectual Property Office in corresponding Korean Patent Application No. 10-2006-7006870.

Official Action issued by the Japanese Patent Office in priority application No. 2003-358227, and English translation thereof.

Official Action issued by the Japanese Patent Office in priority application No. 2003-358228, and English translation thereof.

Official Action issued by the Japanese Patent Office in priority application No. 2003-363422, and English translation thereof.

Official Action issued by the Japanese Patent Office in priority application No. 2003-370556, and English translation thereof.

* cited by examiner

1 Vehicle
11~14 Outer Panel (Electrically Conductive Member)
11A~14A Detection Area

PROXIMITY SENSOR

TECHNICAL FIELD

The present invention relates to a proximity sensor used for detecting a proximity state so as to sense a change of a specific electromagnetic wave emission space and to a proximity sensor using microwaves.

BACKGROUND ART

A conventional common proximity sensor is composed of an oscillating means, a resonance means resonating with higher harmonic waves of an oscillating frequency of the said oscillating means, a sensing electrode connected to the said resonance means and a detecting means for detecting a signal change based on an electrostatic capacity change between the said sensing electrode and a detected object, as described in a first patent publication. The said oscillating means used herein is made into a circuit oscillating at a predetermined frequency that is determined in advance. Moreover, the resonance means composed of an LC serial resonance circuit has a circuit structure that does not resonate with the oscillating frequency but resonates with the higher harmonic waves.

Consequently, if an object comes near the sensing electrode, an electrostatic capacity changes between a surface of the object and the sensing electrode, so that a detection signal changes accordingly. Therefore, it is possible to sense an access of the object by monitoring a signal change of the detection signal.

Such type of proximity sensors improve properties against a temperature change or time degradation by setting an initial value of the electrostatic capacity so as to become a value increased by a fixed amount from a value at the time of harmonizing with the resonant frequency.

The conventional proximity sensor described in the first patent publication detects the electrostatic capacity between the object and the sensing electrode. As a result, a detection distance differs depending on a size of a human or an object. Thus, it is possible that detection accuracy becomes bad with a resultant malfunction. Moreover, there is another problem that there are many malfunctions due to a change of humidity or rain around the detection object. In addition, if the aforesaid proximity sensor is disposed on an electrically conductive body of a vehicle, it detects the electrostatic capacity between the sensing electrode and a metal body earth of the vehicle. Accordingly, it is difficult for the proximity sensor to distinguish an opening/closing operation of such door from a case in which something is caught or hammed in the door or the like. Consequently, there is a problem that it is difficult to mount the sensing electrode on a metallic body of the vehicle from a practical standpoint.

On the other hand, a Theremin circuit is well known as a circuit using an oscillating frequency of about 200 KHz to 1 MHz output from an antenna. The Theremin circuit transforms a change of the oscillating frequency into a change of a sound when a hand of a human comes near an oscillator and the antenna as a part of the oscillator, thereby being using them as an electronic musical instrument. The Theremin circuit is able to detect a change of a distance as a change of a frequency if it is used as a proximity sensor that performs detection using electromagnetic waves.

However, in common Theremin circuits, if there is a human body standing or a human body existing near it, a changed portion of a condenser capacity of a human becomes a variation of the frequency in part of the oscillator. Thus, an influence of a size of the human becomes larger. Consequently, even if a material of a physical body is changed or if a size of the physical body becomes large, it is impossible to improve accuracy or precision as the proximity sensor. Moreover, it becomes impossible to detect the human body or the like at short range, since there is a large influence of the electrostatic capacity between the antenna and the human body.

In view of the above, a technique of a second patent publication radiates microwaves that underwent a wideband frequency modulation. Then, it performs mixing of a reflected received signal of such microwaves with a transmitting signal. Thereafter, it detects reflected waves of the microwaves radiated from the antenna that have a frequency and a phase corresponding to a propagated distance of the microwaves. Then, it makes a mixer output a beat signal for computing a distance to a physical body or object on the basis of a time from radiation to receiving of the reflected waves. As such signal processing, it does multiplication and summation of two orthogonal reference signals having a frequency according to the predetermined distance and the beat signal. Then, it obtains a proportion between two summations and obtains a signal corresponding to a phase of the beat signal from the proportion. Thereafter, it converts a temporal change or spatial change of the signal corresponding to the said phase into a temporal change amount or a spatial change amount of the distance to the object.

Thereby, in case of measuring a distance by used of electric waves or sound waves such as the microwaves, its beam width becomes large to such a degree that a signal representing an average distance can be stably obtained without being affected by distribution of holes or micro irregularity of a reflection body. Therefore, there is no need to carry out an averaging processing separately. Moreover, it has a characteristic that it can speed up a detection rate or speed since the processing of the received signals can be performed at high speed.

First Patent Publication: Japanese Laid Open Patent Publication No. 2001-55852

Second Patent Publication: Japanese Laid Open Patent Publication No. 2001-4741

PROBLEM THAT THE INVENTION IS TO SOLVE

A high frequency must be used in order to, for example, take a sweep width of frequency large and assure a sharpening degree of the frequency with such general frequency modulation continuous wave system (FMCW system) that computes the distance to the physical body by detecting reflection of the microwaves radiated from the antenna and using the time from the radiation to the receiving of the reflected waves.

Particularly, in the frequency modulation continuous wave system described in the second patent publication, if a sweep frequency is made into 1.5 GHz and a sweep frequency time is made into 3 ms (milliseconds), it is possible to estimate the detection distance by a close-range beat cycle. However, it is impossible to detect an absolute distance. Therefore, it is indispensable to use a system such as a triangulation by a laser in conjunction therewith. As a result, there arise restrictions in view of costs, a device getting bigger, a reflection surface or the like, so that there is a problem that it is hard to realize low prices.

Moreover, with a two frequency continuous wave system utilizing a well-known Doppler effect, it is impossible to detect a distance in principle if a physical body as a detection object is halting in an electromagnetic radiation space. Furthermore, with a pulse-type Doppler system, a pulse width needs to be a width of about 1 ps (picoseconds). Thus, there is a problem that it is hard to realize low prices.

Then, the present invention has been made to solve the above-mentioned problems in prior art. It is an object of the present invention to provide a proximity sensor that has no error or malfunction due to an environmental change or an aging degradation caused by rain or humidity change or the like around a detection object, that can be downsized while at low prices and with a high degree of accuracy, that can perform detection even if the detection object stands still, that can speed up a detection rate or speed and that can be used for ones such as vehicles or the like that are structured by metals.

MEANS TO SOLVE THE PROBLEMS

A proximity sensor according to claim 1 constitute a microwave circuit by a space formed by an electrically conductive member and a detection area composed of an electromagnetic radiation space accompanying a change of humidity, temperature and barometric pressure or including an detection object residing in the space formed by the aforesaid detection area and the aforesaid electrically conductive member. A propagation state of the electrically conductive member acting as an antenna changes if the detection object resides in the said detection area. Therefore, the aforesaid microwave circuit formed by the detection object of the detection area and the electrically conductive member can detect an existence or nonexistence of the detection object by a change of an eigenvalue of a radio wave propagation of each of wavelength components (frequency components) as such propagation state. That is, if the detection object resides in the detection area, the propagation state of microwaves varies more in comparison with a case when the detection object does no reside therein. Therefore, a resonant circuit detects it and can determine the existence and nonexistence of the detection object.

Moreover, the microwave circuit radiates microwaves having sufficiently short wavelength relative to a dimension of the electrically conductive member acting as the antenna and detects the existence of the detection object residing within the aforesaid detection area as the change of the eigenvalue of the radio wave propagation by the aforesaid electrically conductive member. Then, the microwave circuit can set many resonance frequencies on the aforesaid electrically conductive member. In other words, the microwave circuit can form many standing waves on the aforesaid electrically conductive member, thereby being able to heighten detection accuracy of the detection object.

A proximity sensor according to claim 2 supplies a wideband frequency of the microwaves radiated from the electrically conductive member acting as the aforesaid antenna by UWB oscillator. The microwave circuit constituting a resonant circuit formed between the electrically conductive member and the aforesaid detection area or the existing detection object comes into a resonant state at a plurality of resonant frequencies supplied from the UWB oscillator. However, the microwave circuit acts to reflect or absorb them at other plurality of frequencies. Then, if the detection object resides in the detection area, the propagation state of the frequency supplied from the UWB oscillator changes accordingly. Thus, it can detect the existence and nonexistence of the detection object. That is, if the detection object resides in the detection area, the propagation state of the frequency supplied from the UWB oscillator changes. Therefore, the resonant circuit can judge or determine the detection object by detecting it.

It detects the change of the aforesaid detection area from difference of the propagation state of the frequency supplied from a feeding point of the aforesaid UWB oscillator. The microwave circuit formed by the detection object in the aforesaid detection area and the aforesaid electrically conductive member becomes the resonant state at the plurality of the resonant frequencies supplied from the UWB oscillator. However, the microwave circuit reflects or absorbs them at the other plurality of the frequencies. Then, if the detection object resides in the detection area, the propagation state of the frequency supplied from the UWB oscillator changes accordingly. Therefore, the microwave circuit can detect existence and nonexistence of the detection object by the difference of the eigenvalue of the radio wave propagation of each of the wavelength components (frequency components). That is, if the detection object resides in the detection area, the propagation state of the frequency supplied from the UWB oscillator changes. Then, the microwave circuit can determine the detection object by detecting it. Here, the aforementioned UWB oscillator supplies electromagnetic waves (energy) to the resonant circuit formed between the aforesaid electrically conductive member and the detection area or the existing detection object at a sufficiently short wavelength frequency relative to the dimension of the entire electrically conductive member while using the aforesaid electrically conductive member as the antenna. Thereby, the microwave circuit knows the existence of the detection object by the difference of the eigenvalue of the radio wave propagation of each of the wavelength components supplied thereto.

Incidentally, the UWB (Ultra Wide Band) is a technique that uses a group of impulse trains of very narrow pulse width as a wideband frequency without using carrier waves so as to transmit signals without modulation. Naturally, a frequency band that it occupies is wider than a frequency used in a conventional communication technology. FCC (Federal Communications Commission) of the United States defines the UWB. According to the definition, it exhibits a frequency-output property shown in FIG. 6.

In FIG. 6, it is defined as $\Delta f/fc = 2(fH-fL)/(fH+fL) \geqq 20\%$ or $\Delta f = fH-fL \geqq 500$ MHz. The UWB in practicing the present invention has the same meaning as the above definition.

Moreover, the electrically conductive member mounted integrally or detachably on a mounted object is not limited to a planar panel but may have a shape obtained by fabricating a strip-shaped or linear member.

The feeding point of the electrically conductive member is set as a point that is roughly estimated by simulation and actual measurement. Then, a time-base generator or a standard oscillator is an oscillator for determining a mixing frequency and may be a normal microwave oscillator.

In a proximity sensor according to claim 3, the change of the eigenvalue of the aforesaid radio wave propagation is detected by use of a mixer, which amplifies the frequency of the aforesaid electrically conductive member by an amplifying means after making it pass through a directional coupler and a bandpass filter connected to the feeding point of the UWB oscillator and which inputs a frequency for down-conversion to mix therewith, and a recognition circuit that detects a change of the aforesaid detection area by the frequency passed through the mixer.

In case there is no detection object, the eigenvalue of the radio wave propagation at the specified frequency scarcely varies. That is, if no detection object resides in the detection area, there takes place a resonant state by the plurality of the resonant frequencies supplied from the UWB oscillator. On the other hand, there takes place reflection or absorption at the other plurality of the frequencies. Then, the propagation state of the frequencies supplied from the UWB oscillator is uniquely determined. However, if the detection object resides in the detection area, the eigenvalue of the radio wave propagation of each of the frequency components supplied from the UWB oscillator changes accordingly. Then, it is possible to detect the existence and the nonexistence of the detection object. At this time, in the microwaves radiated from the electrically conductive member, each wavelength component (frequency component) affected by the detection object is taken out as a frequency with a noise removed through the bandpass filter. Then, it is mixed with the frequency of the time-base generator and down-converted thereby becoming a frequency patter of each frequency that was detected. The frequency patter of each of the detected frequencies is compared with a known frequency patter so as to detect a distance of the detection object or its dimension or the like.

Here, the recognition circuit for detecting the change of the aforesaid detection area may analyze the frequency of the frequency components based upon the propagation state by use of an FFT (FastFourierTransform) utilized in frequency analysis so as to assess or determine the distribution state of each of the frequency components. Moreover, it may use F-V converter (Frequency-Voltage Converter).

In addition, the directional coupler is connected between the UWB oscillator and the feeding point thereof and has a function to introduce them into the bandpass filter side connected to the feeding point of the electrically conductive member and to block off an inverse movement thereto.

In a proximity sensor according to claim 4, the change of the eigenvalue of the aforesaid radio wave propagation is detected by a mixer, which introduces the frequency of the aforesaid electrically conductive member from the aforesaid receiving point that is arranged individually in a number of one or two or more and which inputs a frequency for down-conversion to mix therewith, and a recognition circuit that detects a change of the aforesaid detection area by a frequency passed through the mixer.

If a detection object such as a human comes near the electrically conductive member, in the electromagnetic wave radiation space, an electric field, for example, is reflected or absorbed at the detection object, so that the eigenvalue of each of the frequencies varies. At this time, the eigenvalue of the radio wave propagation of each of the wavelength components (frequency components), which is affected by the detection object in the electromagnetic wave radiation space, is taken out as a frequency with a noise removed by passing it through the bandpass filter from the one or more individually arranged receiving point of the aforesaid electrically conductive member. Then, it is mixed with the frequency of the time-base generator and down-converted, thereby obtaining a frequency patter of each of the detected frequencies thereof. Thus detected frequency patter is compared with a known frequency patter so as to detect a distance or a dimension or the like of the detection object. Particularly, in case there are two or more receiving points arranged individually for the frequency of the electrically conductive member, a plurality of eigenvalue states of the radio wave propagation can be used.

For example, in case the dimension of the electrically conductive member is large, there is a possibility that a detection sensitivity deteriorates. This is because the signal may be attenuated since a distance becomes long when the electromagnetic waves are radiated from the feeding point and returns (to the receiving point) again. Therefore, the sensitivity can be improved more and a S/N ratio can be assured by providing a plurality of receiving points.

In a proximity sensor according to claim 5, a resonant circuit for microwaves is formed between the aforesaid electrically conductive member and the detection object of the aforesaid detection area. Then, it detects, for example, a change of the aforesaid detection object and a moving speed respectively as a change of the frequency pattern and a Doppler shift of an individual frequency by a change of the propagation state of the frequency supplied from the feeding point of the aforesaid UWB oscillator.

The resonant circuit is formed between the detection area as the electromagnetic wave radiation space and the electrically conductive member. Then, if the microwaves are supplied thereto from the aforementioned UWB oscillator, the resonant circuit formed by the detection object at the said detection area and electrically conductive member comes into a resonant state at the plurality of the resonant frequencies supplied from the UWB oscillator. However, it reflects or absorbs them at the other plurality of the frequencies. Therefore, if there is an detection object residing in the detection area, the propagation state of the frequency supplied from the UWB oscillator changes accordingly in comparison with a case in which there is no detection object. Thus, it can detect the existence and the nonexistence of the detection object. Moreover, it can detect the moving speed of the detection object by the Doppler shift of the individual frequency. For instance, if the detection object such as a human comes near the electrically conductive member, the electromagnetic waves of the electromagnetic waves are reflected or absorbed at detection object so as to change the propagation state, thereby changing a field of the detection area. At this time, the frequency detected from the electromagnetic wave radiation space contains each of the wavelength frequencies that are affected by the detection object such as the human. Consequently, it comes out as the change of the frequency pattern corresponding to the propagation state. The recognition circuit compares the detected changing speed and the frequency patter including the Doppler shift of the individual frequency with a known standard or reference frequency pattern in advance. Thus, it is able to detect a distance, dimension moving speed and the like on the basis of the standard frequency patter.

Specifically, the UWB oscillator outputting the microwaves has a wideband. Therefore, the resonant circuit, which is fixed by the detection area as the electromagnetic wave radiation space and the electrically conductive member functioning as the antenna, becomes the resonant state at each of the plurality of the resonant frequencies supplied from the UWB oscillator. On the other hand, it reflects or absorbs waves at the other plurality of the frequencies. Thus, the eigenvalue of their radio wave propagations varies. Accordingly, if the detection object resides in the detection area, the fixed value of the plurality of the frequencies radiated from the UWB oscillator varies in comparison with a case in which there is no detection object. Consequently, it can detect the existence, the nonexistence of the detection object and its moving speed.

The feeding point of the electrically conductive member is set as a point that is roughly estimated by simulation and actual measurement. Moreover, the time-base generator is an oscillator deciding the mixing frequency and may be a normal microwave oscillator.

In a proximity sensor according to claim 6, a recognition of the change and the moving speed of the aforesaid detection object is conducted by use of a mixer, which introduces the frequency of the aforesaid electrically conductive member and which inputs the frequency of the aforesaid UWB oscillator for mixing, and a recognition circuit that detects the change and the moving speed of the aforesaid detection object as a change of a frequency pattern and a Doppler shift of an individual frequency by the frequency passed through the mixer.

Here, the resonant circuit of the microwaves is formed between the detection area as the electromagnetic wave radiation space and the electrically conductive member. Then, the microwaves are supplied thereto from the aforementioned UWB oscillator, the resonant circuit formed by the detection object at the detection area and the electrically conductive member comes into a resonant state at the plurality of the resonant frequencies supplied from the UWB oscillator. However, an eigenvalue of the radio wave propagation of the other plurality of the frequencies varies so as to generate reflection or absorption at the other plurality of the frequencies. At this time, the frequency detected from the electromagnetic wave radiation space has an eigenvalue of the radio wave propagation of the wavelength components (frequency components) that is affected by the detection object. Therefore, it is possible to detect the moving speed of the detection object by a changing speed of the frequency pattern or a shift of the frequency. The recognition circuit compares the detected changing speed of the frequency patter with a known changing speed of the standard frequency pattern in advance on the basis of the changing speed of the frequency pattern of the electrically conductive member. Thus, it can detect a distance, a dimension, the moving speed and the like on the basis of the standard frequency pattern.

The recognition circuit normally recognizes the change of the eigenvalue of the radio wave propagation to the detection area as the electromagnetic wave radiation space by the UWB oscillator. Then, it compares the said detected frequency pattern with the standard frequency pattern corresponding to a known distance, dimension, moving speed and the like, thereby detecting the distance, the dimension, the moving speed and the like. It may be any one as long as it is composed of an analog circuit or a digital circuit. Specifically, it is composed of an F-V converter, an FFT or the like and a memory or the like.

In the resonant circuit of the microwaves including the detection object at the detection area of a proximity sensor according to claim 7, several standing waves are generated on the aforesaid electrically conductive member when the microwaves are oscillated. A specific frequency is radiated from the aforesaid electrically conductive member corresponding to the several standing waves in a relation of the detection area and the aforesaid electrically conductive member. Then, even if the oscillation frequency is radiated from the electrically conductive member to be the electromagnetic waves, there is no change in the electromagnetic wave radiation space when there is no detection object. Thus, a frequency variation of the oscillation frequency at this time is specified by conditions of performance of a real machine. However, if the detection object comes or resides near the electrically conductive member, the electric field of the electromagnetic wave radiation space is reflected or absorbed at the detection object. Thus, the field of the electromagnetic wave radiation space changes in the detection area.

For instance, a microwave circuit is formed at a space between the electrically conductive member functioning as the antenna and the detection object so as to influence on a plurality of oscillating frequencies outputted from the electrically conductive member. Then, each frequency changes in such a frequency as enlarges an amplitude or such a frequency as lessens the amplitude by reflection or absorption of the detection object. Two or more kinds of frequencies exist at the same time in a change of such individual frequency. However, in a practical standpoint, it becomes a frequency state that is a summation of the both frequencies, thereby changing into one frequency as a frequency of a resonance phenomenon. Sensing of the detection object is carried out by picking up this frequency change.

Here, the aforementioned microwave oscillating portion makes the microwaves ride on the aforesaid electrically conductive member, while using the aforesaid electrically conductive member as the antenna for the microwaves at a wavelength of a sufficiently short wavelength relative to a dimension of the entire electrically conductive member. Then, the said microwaves are radiated from the aforesaid electrically conductive member. Moreover, the oscillating frequency in the oscillation circuit varies the frequency of the said radiated microwaves according to the sate of the electromagnetic wave radiation space.

A proximity sensor according to claim 8 comprises an output oscillator for feeding electromagnetic waves of the frequency radiated from the aforesaid electrically conductive member, a mixer for mixing the frequency of the microwaves obtained from the aforesaid electrically conductive member with the frequency obtained from the time-base generator so as to detect a predetermined frequency, a bandpass filter for selecting only a specified frequency from frequencies obtained by mixing in the aforesaid mixer and a feedback system for a feedback operation to the aforesaid output oscillator by standing waves of a frequency passed through the aforesaid bandpass filter.

In the electromagnetic wave radiation space of the resonant circuit of the aforesaid microwave oscillating portion, the frequency obtained from the aforesaid electrically conductive member and the frequency of the time-base generator are mixed so as to be picked out as a frequency of variation difference through the bandpass filter. Then, there is generated in the space a frequency fed back to the output oscillator via the feedback system by existence of the standing waves (VSWR meter output).

Accordingly, the microwaves, which are outputted from the output oscillator and then from the electrically conductive member via the mixer, form the resonance circuit of the microwaves between the detection area as the electromagnetic wave radiation space and the electrically conductive member or the existing detection object, thereby becoming an oscillation in a propagation state according to a state of the electromagnetic wave radiation space of the detection area. Here, even if the oscillating microwaves are radiated from the electrically conductive member, the fixed value of the specified frequency does not change when there is no detection object generating reflection or absorption. Then, there is no frequency variation generated in the resonance circuit.

In contrast, when the detection object comes near the electrically conductive member or the detection object resides, the electric field and magnetic field of the electromagnetic waves radiated from the electrically conductive member are reflected or absorbed at the detection object. Then, the propagation state, that is, the field of the electromagnetic wave radiation space of the detection area varies.

Therefore, if the detection object resides in the electromagnetic wave radiation space composed of the detection area, a change is generated on the basis of the fixed value of the proper frequency determined between the detection object and the electrically conductive member that has been detected until that time. The fixed value of each of the detected frequencies changes in comparison with a case in which there is no detection object in the field of the electromagnetic wave radiation space. The said changing signal is measured beforehand, while using a signal corresponding to a distance, a dimension or the like as a reference signal, so that its characteristic is determined. In this case, it is possible to estimate the distance, the dimension or the like by comparing the reference signal with the aforesaid changing signal. Alternatively, it is possible to detect the distance, the dimension or the like by a predetermined pattern recognition.

Here, the output oscillator outputting the microwaves has a radiation frequency determined by the detection area as the electromagnetic wave radiation space and the electrically conductive member functioning as the antenna. Then, it is a separately-excited microwave oscillator that can have its oscillation frequency separately controlled. The feeding point of the electrically conductive member is made in a point that is roughly estimated by simulation or actual measurement. Moreover, the radiation frequency is set as well. Then, the time-base generator is an oscillator that decides the mixing frequency and may be a normal microwave oscillator.

In addition, the aforementioned mixer may be any one as long as it mixes the frequency (f) obtained from the aforementioned output oscillator with the frequency (fo) obtained from the standard oscillator so as to make them into a mixing frequency (mf+nfo; here "m" and "n" being integer numbers from $-\infty$ to $+\infty$). Moreover, the aforementioned bandpass filter may be any one as long as it gets one, e.g. only a frequency (f+fo) out of the aforementioned mixing frequencies (mf+nfo) for signal processing. Of course, any one of the frequencies may be selected among the aforementioned mixing frequencies (mf+nfo) in practicing the present invention.

The aforesaid microwave oscillating portion of a proximity sensor according to claim 9 distinguishes the change of the propagation state of the aforesaid detection area by standing waves of a frequency passed through the aforesaid bandpass filter.

That is, the standing waves based on the fixed value of the proper frequency, which is determined between the electromagnetic wave radiation space composed of the detection area and the electrically conductive member, are generated on the electrically conductive member. Then, thus detected VSWR (Voltage Standing Wave Ratio) of the frequency passed through the bandpass filter changed in comparison with the propagation state in case which there is no detection object in the field of the electromagnetic wave radiation space. The said changed signal is measured beforehand based on a signal corresponding to a distance, a dimension or the like as a reference signal so that its characteristic is determined. In this case, it is possible to estimate the distance, the dimension or the like by comparing the reference signal with the aforesaid changed signal. Alternatively, it is possible to detect the distance, the dimension or the like by predetermined pattern recognition.

The aforesaid VSWR is a value obtained by dividing an absolute value of a maximum voltage of the standing wave, which is generated by interference of a traveling wave of a specific frequency and a reflected wave, by an absolute value of a minimum voltage. It becomes the minimum value, that is "1" when there is no reflection.

The aforementioned recognition circuit serves to distinguish a change of the propagation state of the detection area, which is the aforementioned electromagnetic wave radiation space, by the VSWR. It acts to detect a distance, a dimension or the like by comparing the VSWR with a known reference corresponding to a distance, a dimension or the like. It is composed of an analog circuit or a digital circuit.

A proximity sensor according to claim 10 has an output oscillator feeding microwaves connected to the aforesaid electrically conductive member so as to feed the microwaves to the aforesaid electrically conductive member. Accordingly, when there is a detection object inside or residing at the detection area set at an outside of the aforesaid electrically conductive member, a pseudo circuit deemed or regarded as a cavity resonant circuit is formed between the aforesaid electrically conductive member and the detection object of the aforesaid detection area. Then, a drive frequency of the said pseudo circuit is obtained from the aforesaid output oscillator. Thus, a change of the fixed value depending on the existence of the detection object of the aforesaid detection area is detected as a change of the oscillating frequency of the aforesaid output oscillator.

When the microwaves are radiated from the said electrically conductive member as the antenna, if the detection object comes near or resides in an area where the said microwaves are radiated, there is formed a pseudo circuit deemed or identified as a cavity resonant circuit in which the electrically conductive member and the detection object function as antennas to each other. Then, a wavelength component (frequency component) corresponding to a distance from the detection object has influence on a plurality of frequencies outputted from the electrically conductive member, while the said detection object becoming the antenna so as to generate coupling of the mutual antennas to the electrically conductive member functioning as the antenna. Thereby, each of the frequencies changes by reflection or absorption of the detection object such that it becomes a frequency enlarging an amplitude or a frequency lessening the amplitude. Accordingly, it is possible to detect the detection object by sensing a shift of the oscillating frequency of the output oscillator and the amplitude of a specific frequency. The detection object is sensed as the shift of the oscillating frequency of the output oscillator and the change of the amplitude of the said frequency. Thus, it is possible to detect the existence and the nonexistence of the detection object, a moving speed of the detection object and a dimension or the like of the detection object.

Here, the aforementioned mounting object means a physical object on which the proximity sensor is mounted. Moreover, the aforementioned electrically conductive member may be any one as long as it is an electrically conductive body that is integrally or separable mounted on the mounting object. A basic structure thereof may be a one-dimensional structure that is one mainly having only a longitudinal direction, a two-dimensional structure that is one mainly having an area or a three-dimensional structure.

The aforementioned output oscillator means a microwave oscillator that is easy to be drawn in a resonant condition at an output side such as a dielectric resonator oscillator, LC oscillator or the like. Moreover, the time-base generator oscillating the stable microwaves of the specific frequency is a microwave oscillator of such stable microwaves as does not change the oscillating frequency of itself by influence of an outside.

In addition, the aforementioned detection area is determined by the electrically conductive member and the wavelength output of the microwaves. Normally, it is set at a desired distance within 50 cm or, preferably, within 30 cm.

As described above, when the microwaves are radiated from the electrically conductive member, if the detection object comes near to it, there is formed a pseudo circuit that is deemed as the cavity resonant circuit in which the electrically conductive member and the detection object act as the antenna with each other. Here, in the present invention, the electromagnetic waves that are outputted from the output oscillator and radiated from the electrically conductive member is reflected or absorbed at the detection object in a two-dimensional area. The said two-dimensional area becomes the aforementioned detection area. Alternatively, a three-dimensional space made by three-dimensionally grasping the aforementioned detection area becomes the electromagnetic wave radiation space in which the microwaves are radiated.

A proximity sensor according to claim 7 comprises a mixer for getting a frequency outputted from the aforesaid output oscillator and mixing frequency got from the time-base generator therewith and a recognition circuit for selecting the frequency mixed by the aforesaid mixer and recognizing a change of the detection object inside the detection area, which is set an outside of the electrically conductive member, by a signal of a frequency of detected waves.

When the microwaves are radiated while making the aforesaid electrically conductive member act as the antenna, if a detection object comes near there or resides there, there is constructed a pseudo circuit that is deemed as a cavity resonant circuit in which the electrically conductive member and the detection object function as antennas with each other. Here, the microwaves outputted from the output oscillator and radiated from the electrically conductive member are reflected and absorbed at the detection object. By this existence of the detection object, the electric field of the electromagnetic waves radiated from the electrically conductive member are reflected or absorbed at the detection object and it influence is presented as the change of the output frequency of the output oscillator. The said changed output frequency of the output oscillator is mixed by the mixer with the frequency obtained from the time-base generator so as to be down-converted. Then, the existence and the nonexistence of the detection object, the moving speed of the detection object, the dimension of the detection object and the like are detected by checking or determining the shift of the frequency passed through the aforesaid mixer and the change of the amplitude of the said frequency through the recognition circuit.

Here, the aforementioned mounting object, the output oscillator and the detection area are similar to those of claim 7. Moreover, the electromagnetic wave radiation space is similar to that of claim 7. The aforementioned mixer may be any one as long as it mixes the obtained frequency (f) with the frequency (fo) obtained from the time-base generator so as to get a down-converted mixing frequency (mf+nfo; here the m and n being integers from to $-\infty$ to $+\infty$). Furthermore, the aforementioned bandpass filter picks up only one frequency (|f+fo| or |f−fo|) out of the mixing frequencies (|f+fo|, |f−fo|). It may be any one which processes signals before a wave detector or which processes the signals after passed through the wave detector. In addition, the aforementioned recognition circuit recognizes the change of the detection area that is the aforementioned electromagnetic wave radiation space as the change of the oscillating frequency (the shift of the frequency passed through the miser or the change of the amplitude of the said frequency or the like). It detects linearly the distance, dimension or the like of the detection object by comparing the shift or the change with a shift of the frequency as a reference corresponding to a known distance, dimension or the like or a change of an amplitude of the said frequency or the like. With the shift of the frequency passed through the aforesaid mixer or the change of the amplitude of the said frequency, it is possible to detect a moving speed by introducing a temporal element or factor. This recognition circuit may be any one as long as it is composed of an analog circuit or a digital circuit. Specifically, it is composed of an F-V circuit, an FFT or the like and a memory. It has a map in which shifts of frequencies passed through the aforesaid mixer, changes of the said frequencies or the like. It makes a decision by comparison with an information in the said map. Moreover, if the frequency passed through the mixer is limited, it is possible to obtain a digital output between such frequency and a predetermined threshold value by deciding whether the said frequency passed through or not.

The aforesaid output oscillator of a proximity sensor according to claim 8 is made of a dielectric resonator oscillator (DRO) or an LC oscillator. Therefore, it can be an oscillator that generates microwaves at low price and that can be expected to operate accurately.

A proximity sensor according to claim 9 comprises an oscillator circuit that sets a feeding point and a receiving point on the aforesaid electrically conductive member to self-oscillate the microwaves by amplifying a frequency obtained from the aforesaid receiving point and feeding back the said frequency to the aforesaid feeding point. Then, the proximity sensor detects the change of the aforesaid detection area as the change of the frequency obtained from the aforesaid oscillator circuit.

Accordingly, when the transmission circuit oscillates with the electrically conductive member as the antenna, the electromagnetic waves are radiated from the electrically conductive member to the detection area. The said transmission circuit becomes a resonant state that is determined by an eigenvalue of radio wave propagation of a specific frequency state radiated from the aforesaid electrically conductive member by relation of the said detection area and the electrically conductive member. Even if the electromagnetic waves of the oscillating frequency are radiated from the electrically conductive member, any frequency change is not generated in the oscillating frequency in case there is no detection object, which generates reflection or absorption, in the detection area. However, if the detection object comes near the detection area that is the electromagnetic wave radiation space, there is formed a microwave oscillator circuit in which the fixed value of each of the frequencies has changed so as to be different from the propagation state until that time between the electrically conductive member and the detection object. That is, if the detection object comes near the electrically conductive member, the electric field of the detection area is reflected or absorbed by the detection object, so that the field of the electromagnetic wave radiation space changes. It is possible to detect an access of the detection object by sensing such change. Here, the change of the frequency of the detection object means a shift of the frequency or a magnitude of an amplitude (magnitude of voltage) of the said frequency or the like.

Here, the aforementioned electrically conductive member may be an electrically conductive body that is integrally or separably mounted on the mounting object. It may have a basic structure made into a one-dimensional structure (mainly having only a longitudinal direction), a two-dimensional structure (mainly having an area) or a three-dimensional structure. Moreover, the detection area set at an outside of the aforementioned oscillator circuit is determined by the electrically conductive member and an output of the wavelength of the microwaves. It is normally set at a desired distance within 50 cm or, preferably, within 30 cm. Then, the aforementioned oscillator circuit may be any one that can set a feeding point and a receiving point on the electrically conductive member, amplify a frequency obtained from the receiving point and feed back the said frequency to the aforesaid feeding point so as to self-oscillate the microwaves. Furthermore, the detection of the change of the aforementioned area as the change of the frequency obtained from the oscillator circuit means the detection of the change of the detection object (dielectric body) such as a human near the electrically conductive member as the change of the frequency obtained from the oscillator circuit. It is possible to detect the change of the frequency as a pattern or to determine it by comparison with a predetermined threshold value.

The feeding point and the receiving point of the aforementioned electrically conductive member are set at points that are estimated or corrected and confirmed by a simulation or a simulation with a real machine.

In a proximity sensor according to claim 10, an oscillator circuit is composed of a bandpass filter making the frequency obtained from the aforesaid receiving point of the aforesaid electrically conductive member into a specific frequency range and a high-frequency amplifier amplifying and feeding back the frequency of the said frequency range to the aforesaid feeding point. The oscillator circuit makes the frequency pass of the specific frequency range by passing it through the bandpass filter from the receiving point of the electrically conductive member. Then, it amplifies the frequency of the said specific frequency range and feeds it back to the feeding point of the electrically conductive member. Thereby, there is formed an oscillator circuit with the electrically conductive member as the antenna, so that the microwaves area self-oscillated. The electromagnetic waves are radiated from the electrically conductive member to the detection area so as to become the specific frequency state at which the waves are radiated from the aforesaid electrically conductive member in relation with the said detection area and the electrically conductive member. That is, the plurality of the frequencies becomes the resonant state. Even if the oscillating frequency of the oscillator circuit is radiated from the electrically conductive member, no frequency change is generated on the oscillating frequency in case there is no detection object causing reflection or absorption in the detection area.

However, if a detection object (dielectric body) such as a human comes near the detection area that is the electromagnetic wave radiation space, the cavity oscillator circuit of the microwaves area formed between the electrically conductive member and the detection object. Then, the resonant frequency state radiated from the aforesaid electrically conductive member varies. That is, if the detection object comes near the electrically conductive member, the field of the electromagnetic wave radiation space changes. The directional coupler detects a change of an eigenvalue of radio wave propagation of each of the frequencies. An output of the directional coupler is passed through the mixer that inputs a frequency for down-converting. Then, the change of the aforesaid detection area is detected by an obtained frequency thereof. Here, the electromagnetic wave radiation space does not mean a range or reach of the electromagnetic waves but means a detectable detection area.

Here, the aforementioned recognition circuit detects the change of the diction object near the electrically conductive member to be the detection area as the change of the frequency obtained from the oscillator circuit. It is possible to detect the change of the frequency as a patter. Alternatively, it is possible to determine it by comparison with a predetermined threshold value. Moreover, the aforementioned bandpass filter removes a noise of the frequency picked out by the feeding point of the aforementioned electrically conductive member (including a low frequency removal), thereby determining a predetermined frequency band of the microwaves. Furthermore, the aforementioned mixer mixes the frequency (f) obtained from the feeding point of the electrically conductive member with the frequency (fo) so as to make a down-converted mixing frequency (mf+nfo; here, "m" and "n" being intergers of $-\infty$ to $+\infty$).

In addition, the aforementioned recognition circuit normally recognizes the change of the detection area, which is the aforementioned electromagnetic wave radiation space, as the change of the oscillating frequency by the frequency pattern. The recognition circuit linearly detects a distance, dimension or the like of the detection object (dielectric body) by comparison with a reference frequency pattern corresponding to a known distance, dimension or the like. Moreover, it can detect a moving speed by introducing a temporal factor as a change of the reference frequency pattern. The said recognition circuit may be constituted by an analog circuit or a digital circuit. Specifically, it is composed of an F-V converter, an FFT or the like and a memory or the like.

In a proximity sensor according to claim 11, the electrically conductive member that is integrally or separably mounted on the aforesaid mounting object is made into an openable body that is attached openably and closably to a vehicle. Therefore, the sensor can make its structure simple and be manufactured at low costs.

EFFECTS OF THE INVENTION

In the proximity sensor according to claim 1, the microwave circuit detects the detection object that resides in the space inside the detection area, which is composed of the electromagnetic wave radiation space accompanying a change of humidity, temperature and air pressure, as the change of the eigenvalue of the radio wave propagation by the aforesaid electrically conductive member. If the detection object resides in the detection area, there is a change in the eigenvalue of the radio wave propagation of each of the frequencies of the electrically conductive member functioning as the antenna. Therefore, the circuit can detect the existence and nonexistence of the detection object by the said change of the eigenvalue. That is, if the detection object resides in the detection area, the propagation state of the microwaves varies. Then, the aforesaid microwave circuit can determined the existence and nonexistence of the detection object by sensing the change of the said propagation condition.

Accordingly, the microwave circuit, which is largely influenced mutually by the electric field and the magnetic field of the electromagnetic waves, is formed at the space between the detection object of the detection area being the electromagnetic wave radiation space and the electrically conductive member. Then, the frequency is propagated in accordance with the said detection area and the said detection object. In case there is no detection object outside the electrically conductive member, the fixed value of a transfer function or the like that is propagated by the electromagnetic waves is uniquely determined in accordance with antenna characteristics. Particularly, the microwave circuit is formed between the electrically conductive member and the detection object, while there being a large mutual influence of the electric field and the magnetic field of the electromagnetic waves. Then, the circuit is hard to be affected by the electrostatic capacity of the detection object in the detection area. Thus, it realizes a detection that is not affected by an atmosphere such as humidity, temperature, water vapors, pressure or the like, in comparison with a conventional electrostatic sensing system type. Consequently, the device becomes low price and its detecting accuracy improves. Moreover, the detection is possible even if the detection object does not move in the detection area, in contrast to the detection of the Doppler frequency. Furthermore, there are many resonant frequencies that the electrically conductive member acting as the antenna can radiate, while the change of the said propagation state being detected. Consequently, it can be practiced without any special detailed examination or check of characteristics of the electrically conductive member.

Therefore, it can be the proximity sensor that has no malfunction due to an environmental change caused by rain or humidity change around the detection object or due to aged deterioration, that can be downsized and low-priced while having high accuracy, that can detect the detection object even if it stands still, that can speed up a sensing rate and that can be used in any one composed of a metal such as a vehicle or the like.

The UWB oscillator has the frequency of the microwaves radiated from the aforesaid electrically conductive member as the antenna of the proximity sensor according to claim 2. The UWB oscillator supplies the wideband microwaves to the aforesaid electrically conductive member. At this time, it becomes the resonant state at each of the plurality of the resonant frequencies supplied from the UWB oscillator, while generating reflection or absorption at the other plurality of the frequencies. Thus, the fixed values of these radio wave propagations vary. Therefore, it is possible to determine the detection object by detecting it.

Accordingly, the UWB oscillator connected to the feeding point of the electrically conductive member radiates microwave impulses having a broad bandwidth, for example. Thus radiated microwave impulses are radiated by use of the electrically conductive member as the antenna. At this time, in case there is no detection object outside the electrically conductive member, the fixed value such as the transfer function or the like is uniquely determined in accordance with the antenna characteristics. That is, if the signals radiated from the antenna are taken as the fixed values for comparison with the signals transmitted from the oscillator side, the antenna characteristics are to be determined.

At this time, the microwave circuit forms the microwave resonant circuit that receives the big mutual influence from the electric field and the magnetic field of the electromagnetic waves. Then, the frequency of the UWB oscillator is propagated in accordance with the said detection area and the said detection object. Particularly, by use of the microwaves of the UWB oscillator as the used frequency, the mutual influence of the electric field and the magnetic field of the electromagnetic waves becomes large, while being hard to be affected by the electrostatic capacity of the detection object in the detection area. Therefore, it realizes the detection that is not affected by the ambient atmosphere such as the humidity, the temperature, the moisture, the pressure (barometric pressure) or the like in the detection area. As a result, the device becomes low price and the detection accuracy improves. Moreover, the detection is possible even if the detection object does not move in the detection area, in contrast with the detection of the Doppler frequency. In particular, by use of the UWB oscillator, there exist many resonant frequencies that can be radiated from the electrically conductive member so that the change of the propagation state is detected. Then, it can be practiced without specially checking in detail the characteristics of the electrically conductive member. Thus, standardization is possible. Furthermore, the UWB oscillator connected to the feeding point of the electrically conductive member radiates the microwave impulses of broad bandwidth. Consequently, there exist many resonant frequencies in the electrically conductive member, so that many fixed values of the radio wave propagation can be obtained. As a result, it is possible to correctly detect the detection object by use of it.

The proximity sensor according to claim 3 detects the change of the fixed value of the aforesaid radio wave propagation by use of the mixer, which makes the frequency of the aforesaid electrically conductive member passed through the directional coupler and the bandpass filter connected to the feeding point of the UWB oscillator and thereafter amplifying it by the amplifying means, while inputting the down-converting frequency for mixing, and the recognition circuit that detects the change of the aforesaid detection area by the frequency passed through the aforesaid mixer. Therefore, in addition to the effects recited in claim 2, if the detection object resides in the detection area, the electromagnetic waves of the frequency supplied from the UWB oscillator are radiated from the feeding point, so that the signal returning to the feeding point changes. Such signal change is detected as the change of the plurality of the fixed values. At this time, the detected pattern of the frequency passed through the bandpass filter becomes the frequency pattern that removes the noise. Moreover, the directional coupler can eliminate influence on the output of the UWB oscillator that is caused by reflection from the feeding point of the electrically conductive member and a disturbance entering the feeding point from an outside. Consequently, the UWB oscillator can oscillate stably.

In the proximity sensor according to claim 4, the change of the eigenvalue of the aforesaid radio wave propagation is carried out by use of the mixer and the recognition circuit. The mixer introduces the frequency of the aforesaid electrically conductive member from one or more aforesaid receiving points that are disposed individually, while inputting the frequency for down-converting, thereby mixing them. The recognition circuit detects the change of the aforesaid detection area by the frequency passed through the mixer. Accordingly, in addition to the effects recited in claim 2 or claim 3, the detected pattern of the frequency passed through the bandpass filter is compared with the data, which are stored in advance as the standard frequency pattern corresponding to the distance, dimension or the like of the detection object by use of the known frequency pattern, so that it is possible to detect the distance, the dimension or the like of the detection object on the basis of the said standard frequency pattern.

In other words, the impulse signals returning to the receiving point can be deemed as the fixed value of the antenna characteristics. The microwave circuit is formed at the space between the electrically conductive member and the detection object. The electrically conductive member and the detection object have the fixed values such as the transfer function or the like that is proper to the plurality of the frequencies having the resonant frequency. Then, it is possible to detect the case in which the detection object exists at the outside of the electrically conductive member and the case in which it does not exists there, as the difference of the fixed value of the radio wave propagation from the one or more receiving points disposed individually. Thus, since the difference of the propagation state of the frequency supplied from the UWB oscillator varies depending on the existence and nonexistence of the detection object at the detection area, each of the frequencies is detected as the Doppler shift. Moreover, the detection resolution improves more and the SIN ratio is assured by providing a plurality of receiving points.

The proximity sensor according to claim 5 forms the resonant circuit of the microwaves between the detection object at the detection area and the electrically conductive member so as to feed the microwaves from the UWB oscillator having the frequency of the microwaves to the electrically conductive member functioning as the antenna. Then, each of the plurality of the oscillating frequencies supplied from the UWB oscillator comes in the resonant state, while being reflected or absorbed at the other frequencies. Thus, the eigenvalue of their radio wave propagation changed depending on whether the detection object exists in the detection area or not. Accordingly, if the detection object exists in the detection area, the eigenvalue of the frequency supplied from the UWB oscillator changes. It is possible to determine the moving speed of the detection object by detecting it as the Doppler shift of the individual frequency of the eigenvalue of the radio wave propagation.

At this time, the microwave circuit, in which there is a large mutual influence of the electric field and the magnetic field of the electromagnetic waves, is formed between the detection object at the detection area that is the electromagnetic wave radiation space and the member. Then, the frequency of the UWB oscillator is propagated in accordance with the said detection area and the said detection object. Particularly, since the wide-band microwaves are used as a used frequency, the mutual influence of the electric field and the magnetic field of the electromagnetic waves is large and it is hard to be affected by the electrostatic capacity of the detection object at the detection area. Consequently, it is possible to realize detection that is free from the influence of the ambient atmosphere such as humidity, temperature, moisture, pressure or the like, in comparison with the conventional type of the electrostatic capacity sensing system. Moreover, the shift or the changing speed of the propagation state is detected by the shift or the changing speed or the like of the frequency pattern. Therefore, it is possible to detect the distance of the moving speed of the detection object. Particularly, there exist many resonant frequencies that can be radiated from the electrically conductive member by use of the UWB oscillator, so that it can be practiced without special detailed examination of the characteristics of the electrically conductive member and standardization is also possible.

The proximity sensor according to claim 5 forms the microwave circuit between the detection object at the detection area and the electrically conductive member. The UWB oscillator supplies the microwaves to the electrically conductive member acting as the antenna. At this time, they become the resonant state at the plurality of the resonant frequencies supplied from the UWB oscillator, while being reflected or absorbed at the other plurality of the frequencies, so that the eigenvalue of their radio wave propagation. Accordingly, in addition to the effect of claim 4, the frequency detected at the electrically conductive member has the wavelength component (frequency component) affected by the detection object. Therefore, it is possible to detect the moving speed of the said detection object by the changing speed of the frequency pattern or the shift of the frequency based upon each of the frequencies. Moreover, the Doppler shift of each of the frequencies of the detected frequency pattern is compared with the changing speed of the shift of the previously know standard frequency pattern on the basis of the changing speed of the shift of the frequency pattern of the electrically conductive member. Thus, it is possible to detect distance, dimension, moving speed or the like from the said standard frequency pattern.

The proximity sensor according to claim 6 comprises the microwave oscillating portion that excites the frequency radiated from the aforesaid electrically conductive member. Therefore, even if the frequency of the microwave oscillating portion is radiated as the microwaves from the electrically conductive member, there is no variation of the frequency of the microwave oscillating portion if there is no detection object that produces the reflection or the absorption. If the detection object comes near the electrically conductive member, the electric field of the radiated electromagnetic waves is reflected or absorbed at the detection object. Then, the field of the electromagnetic wave radiation space changes, so that there takes place a change of the wavelength component (frequency) corresponding to the distance from the detection object and the dimension. It is possible to detect the distance and the dimension by thus detected change.

At this time, the microwave oscillating portion forms the resonant circuit of the microwaves between the detection object at the detection area being the electromagnetic wave radiation space and the electrically conductive member. Then, the microwave oscillating portion becomes the resonant state in accordance with the said detection area and the said detection object. The microwave oscillating portion of such oscillating state is largely affected mutually by the electric field and the magnetic field of the electromagnetic waves. Consequently, it can be taken as the resonant circuit of the electric field intensity (magnetic field) between the detection object at the said detection area and the electrically conductive member. As a result, it is hard to be affected by the electrostatic capacity of the detection object at the electromagnetic wave radiation space.

Especially, the microwave oscillating portion forms the resonant circuit of the microwaves between the detection object at the detection area being the electromagnetic wave radiation space and the electrically conductive member. Then, the electromagnetic wave radiation space can be deemed as the resonant circuit of the electric field intensity (magnetic field) between the antennas. The mutual influence of the electric field and the magnetic field of the electromagnetic waves becomes larger, so that it is hard to be affected by the electrostatic capacity of the detection object of the detection area. Consequently, the detection accuracy improves. Moreover, since the microwaves of the working frequency of 300 MHz to 300 GHz are used, it is possible to realize the detection that is not affected by the atmosphere such as the humidity, temperature, moisture, pressure or the like of the detection area in comparison with the conventional type of the electrostatic capacity sensing system. Consequently, the system becomes low price. Therefore, the proximity sensor according to the present invention is easy to detect the near distance and enables detection at close range. Moreover, the proximity sensor can detect the state while being manufactured at low costs. Furthermore, in contrast to the Doppler detection, the proximity sensor enables the detection even if the detection object at the diction area does not move.

In the aforesaid microwave oscillating portion of the proximity sensor according to claim 8, the microwaves outputted from the output oscillator via the mixer form the resonant circuit between the detection object at the detection area being the electromagnetic wave radiation space and the electrically conductive member, thereby becoming the oscillating state in accordance with the state of the electromagnetic wave radiation space of the said detection area. Here, even if the oscillating microwaves are radiated from the electrically conductive member, the output state of the specific frequency does not change in case there is no detection object that generates the reflection or the absorption. Then, there is no variation in the frequency of the resonant circuit.

If the detection object such as a human or the like comes near the electrically conductive member or if the detection object resides there, the electric field of the electromagnetic waves radiated from the electrically conductive member is reflected or absorbed at the detection object. Then, the field of the electromagnetic wave radiation space of the detection area varies. At this time, the wavelength component affected by the detection object in the field of the electromagnetic wave radiation space is mixed with the frequency of the time-base generator and then taken out as the frequency of the variation difference through the bandpass filter. Thereby, the existence of the detection object is distinguished by its standing waves.

Accordingly, if the detection object resides in the electromagnetic wave radiation space made of the detection area, there are generated standing waves of a specific frequency that has not been detected until then. That is, the detected standing waves change in comparison with the case in which there is no detection object in the field of the electromagnetic wave radiation space. With respect to thus changed signal, if the signal corresponding to the distance, the dimension or the like is measured in advance as the reference signal so as to determine its characteristics, the aforesaid changed signal is compared with the said reference signal. Thereby, the distance, the dimension or the like can be detected by estimating the distance, the dimension or the like or by the specific pattern recognition.

At this time, in the proximity sensor according to the present invention, the output oscillator forms the microwave circuit between the detection object at the detection area being the electromagnetic wave radiation space and itself. Then, it oscillates at the specific frequency depending on the said detection area and the said detection object. Thus, the mutual influence of the electric field and the magnetic field of the electromagnetic waves becomes large. Thereby, it becomes hard to be affected by the electrostatic capacity of the detection object at the detection area, thereby improving the detection accuracy.

The aforesaid microwave oscillating portion of the proximity sensor according to claim 7 comprises the recognition circuit for distinguishing the change of the aforesaid detection area by the standing waves of the frequency passed through the aforesaid bandpass filter. Accordingly, in addition to the effect of claim 6 or claim 7, the VSWR of the detected frequency passed through the bandpass filter changes in comparison with the case in which there is no detection object such as a human or the like in the field of the electromagnetic wave radiation space. As concerns the said changed signal, if the characteristics are determined previously by the signal corresponding to the distance, the dimension of the like as the reference signal, the said reference signal and the aforesaid changed signal are compared so that the distance, the dimension or the like can be detected by estimating the distance, the dimension of the like or by the specific pattern recognition.

The proximity sensor according to claim 7 forms the deemed circuit that is deemed as the cavity resonant circuit between the aforesaid electrically conductive member and the detection object of the aforesaid detection area. Then, the frequency of the said deemed circuit is obtained from the output oscillator that supplies the microwaves radiated from the aforesaid electrically conductive member as the antenna at the frequency of sufficiently short wavelength to the dimension of the aforesaid electrically conductive member. Thus, the shift, the amplitude or the like of the oscillating frequency of the aforesaid output oscillator is detected.

Accordingly, the electromagnetic waves radiated from the electrically conductive member, which forms the deemed circuit taken as the cavity resonant circuit, are reflected or absorbed at the detection object. Then, its influence appears as the change of the output frequency of the output oscillator. Thus, it is possible to detect the existence and nonexistence of the detection object, the moving speed of the detection object, the dimension of the detection object or the like by detecting the shift of the frequency of the oscillating frequency of the said output oscillator or the change of the amplitude of the said frequency.

Even if the proximity sensor is constructed by use of the well-know Theremin circuit, the one having a short distance to the detection object in view of its wavelength detects the detection object as a condenser capacity between the electrically conductive member acting as the antenna and an earth. Then, a distance accuracy error becomes large depending on a size of the said condenser capacity. However, the present invention forms the deemed circuit that is deemed as the cavity resonant circuit of the microwaves corresponding to a relative distance between the detection object and the electrically conductive member acting as the antenna. Therefore, the mutual influence of the electric field and the magnetic field of the electromagnetic waves becomes larger, so that the sensor is hard to be affected by the electrostatic capacity of the detection object at the electromagnetic wave radiation space. Thus, the detection accuracy improves. Moreover, the sensor uses the microwaves of the working frequency of 300 MHz to 300 GHz. Thereby, the sensor enables the sensing that is not affected by the atmosphere such as the humidity, temperature, moisture, pressure or the like in the electromagnetic wave radiation space. Thus, the device becomes low price.

As a result, with the proximity sensor according to the present invention, the detection at short range is easy. Moreover, it can be manufactured at low costs, while enabling the detection at short range state.

The proximity sensor according to claim 7 forms the deemed circuit that is deemed or taken as the cavity resonant circuit between the aforesaid electrically conductive member and the detection object of the aforesaid detection area. Then, the frequency of the said deemed circuit is obtained from the output oscillator that supplies it to the electrically conductive member and then mixed with the frequency obtained from the time-base generator. Thereafter, a specific frequency is chosen from the mixed frequency and detected. Thereby, the recognition circuit detects the change of the detection object inside the detection area, which is set at the outside of the aforesaid electrically conductive member, by the signal of the said detected frequency.

Therefore, the electromagnetic waves radiated from the electrically conductive member forming the deemed circuit, which is deemed as the cavity resonant circuit, are reflected or absorbed at the detection object. Then, the influence thereof is shown as the change of the output frequency of the output oscillator. Consequently, it is possible to detect the existence and nonexistence of the detection object, the moving speed of the detection object, the dimension of the detection object or the like by sensing the shift of the frequency of the oscillating frequency of the said output oscillator and the change of the amplitude of the said frequency by the recognition circuit.

Even if the proximity sensor is constructed by use of the well-know Theremin circuit, it detects the detection object as a condenser capacity between the electrically conductive member acting as the antenna and an earth. Then, a distance accuracy error becomes large. However, the present invention forms the deemed circuit that is deemed as the cavity resonant circuit of the microwaves corresponding to a relative distance between the detection object and the electrically conductive member acting as the antenna. Therefore, the mutual influence of the electric field and the magnetic field of the electromagnetic waves becomes larger, so that the sensor is hard to be affected by the electrostatic capacity of the detection object at the electromagnetic wave radiation space. Thus, the detection accuracy improves. Moreover, the sensor uses the microwaves of the working frequency of 300 MHz to 300 GHz. Thereby, the sensor enables the sensing that is not affected by the atmosphere such as the humidity, temperature, moisture, pressure or the like in the electromagnetic wave radiation space. Thus, the device becomes low price.

As a result, with the proximity sensor according to the present invention, the detection at short range is easy. Moreover, it can be manufactured at low costs, while enabling the detection at short range state.

The proximity sensor according to claim 8 uses the dielectric oscillator or the LC oscillator as the aforesaid output oscillator of claim 7 or claim 7 mentioned above. Therefore, the oscillator itself becomes low-priced, so that the device can be low-priced.

In the proximity sensor according to claim 8, the oscillating circuit sets the feeding point and the receiving point on the electrically conductive member, which is integrally or separably mounted on the mounting object, amplifies the frequency obtained from the aforesaid receiving point and feeds back the said frequency to the aforesaid feeding point. Thereby, the oscillating circuit oscillates the microwaves, via the aforesaid electrically conductive member as the antenna, at a frequency of a sufficiently short wavelength relative to the size of the aforesaid electrically conductive member. The change of the detection area, which is set at the outside of the aforesaid electrically conductive member, is detected as the change of the frequency obtained from the aforesaid oscillating circuit.

Accordingly, the detection object and the electrically conductive member function as the antennas to each other between the detection object at the detection area being the electromagnetic wave radiation space and the electrically conductive member. They are deemed as the cavity resonant circuit of the microwaves. The oscillating frequency of the microwaves changes in accordance with the said detection area and the said detection object. Consequently, the mutual influence of the electric field and the magnetic field of the electromagnetic waves is large, so that the cavity resonant circuit of the electric field intensity (magnetic field) between the electrically conductive member and it is hard to be affected by the electrostatic capacity of the detection object at the electromagnetic wave radiation space.

Particularly, at the space between the detection object of the detection area and the electrically conductive member where the oscillating circuit of the microwaves defines the electromagnetic wave radiation space, both the members function as the antennas. Then, it can be deemed as the cavity resonant circuit of the electric intensity field (magnetic field) between the antennas. Thus, the mutual influence of the electric field and the magnetic field of the electromagnetic waves becomes larger, so that it becomes hard to be affected by the electrostatic capacity of the detection object at the detection area. Consequently, the detection accuracy improves. Moreover, the microwaves of the working frequency of 300 MHz to 300 GHz are used. Therefore, it enables the detection that is free from influence of the atmosphere such as the humidity, temperature, moisture, pressure or the like at the detection area, in comparison with the conventional type of the electrostatic capacity detection system. As a result, the device becomes low-priced. In addition, it can detect the detection object of the detection area even if it is not moving, in contrast with the Doppler detection using the microwaves.

Therefore, with the proximity sensor according to the present invention, the detection at short range is easy. Moreover, it can be manufactured at low costs, while enabling the detection at short range state.

The proximity sensor according to claim 10 sets the feeding point and the receiving point on the electrically conductive member, which is integrally or separably mounted on the mounting object, amplifies the frequency obtained from the aforesaid receiving point and feeds back the said frequency to the aforesaid feeding point. Thereby, the sensor oscillates the microwaves, via the aforesaid electrically conductive member as the antenna, at a frequency of a sufficiently short wavelength relative to the size of the aforesaid electrically conductive member. At this time, the electromagnetic wave radiation space constituting the microwave oscillating circuit comes into a specific oscillating state by the bandpass filter, which makes the frequency obtained from the receiving point of the electrically conductive member into a specific frequency range, and the high-frequency amplifier that amplifies the frequency of the said frequency range so as to feed it back to the aforesaid feeding point. The directional coupler is connected on a path between the aforesaid receiving point and the feeding point so as to take out the oscillating state of the aforesaid oscillating circuit. The directional coupler detects the change of the detection area that is set at the outside of the electrically conductive member so as to distinguish it by the recognition circuit. Such oscillating frequency of the microwaves makes the feedback state generated in the directional coupler mixed by the mixer inputting the frequency for downconverting. Then, the change of the detection area is determined by the recognition circuit on the basis of the frequency passed through the aforesaid mixer.

That is, the recognition circuit extracts the oscillating frequency of the microwaves through the directional coupler so as to determine the pattern of the said oscillating frequency. Thus detected pattern of the oscillating frequency is stored as the standard frequency pattern corresponding to the distance, dimension or the like of the detection object. Then, it is compared with the date detected through the directional coupler so as to sense the distance, dimension of the like of the detection object on the basis of the said standard frequency pattern.

At this time, if there is no detection object in the detection area, the oscillating frequency radiated from the electrically conductive member is simply made into a specific threshold value. Thus, the sensing of the detection object is enabled by "1" and "0" as the change of the field of the detection area when the detected frequency varies from the said threshold value.

The proximity sensor according to claim 11 makes the electrically conductive member, which is integrally or separably mounted on the aforesaid vehicle, into the opening/closing body that is mounted openably and closably on the vehicle. Therefore, in addition to the effect of claim 1 or claim 2, its structure is made simple and it is manufactured at low costs.

Figure 1:
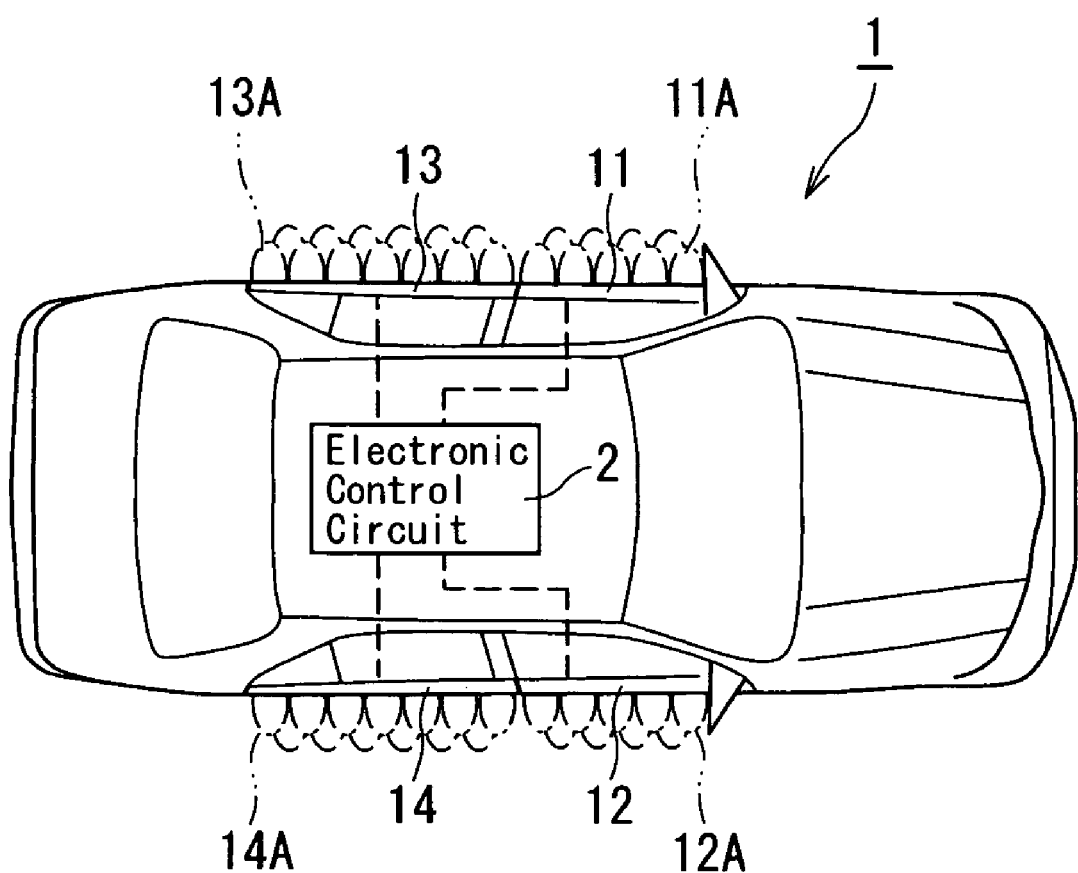
FIG. 1 is a concept view of a total structure of a vehicle installing a proximity sensor of a first or a second embodiment of the present invention.

DESCRIPTION OF CODES 1 vehicle
11-14 outer panel (electrically conductive member)
11A-14A detection area
121 output oscillator
21 UWB oscillator
22 time-base generator
221 output oscillator
23 mixer
24 bandpass filter
26 F-V converter
27 recognition circuit
28 feedback system
29 VSWR meter
31 detection object
32 wave detector
33 S meter
50 deemed circuit taken as cavity resonant circuit
60 oscillator

BEST MODE FOR EMBODYING THE INVENTION

Proximity sensors according to embodiments of the present invention are as described hereafter by use of drawings.

Here, in a second embodiment and subsequent embodiments of the present invention, one having a same mark or a same code as that of a first embodiment shows a constitutional part that is same as or that corresponds to that of the aforesaid first embodiment. Redundant description of common functions is eliminated as much as possible.

First Embodiment

Figure 2:
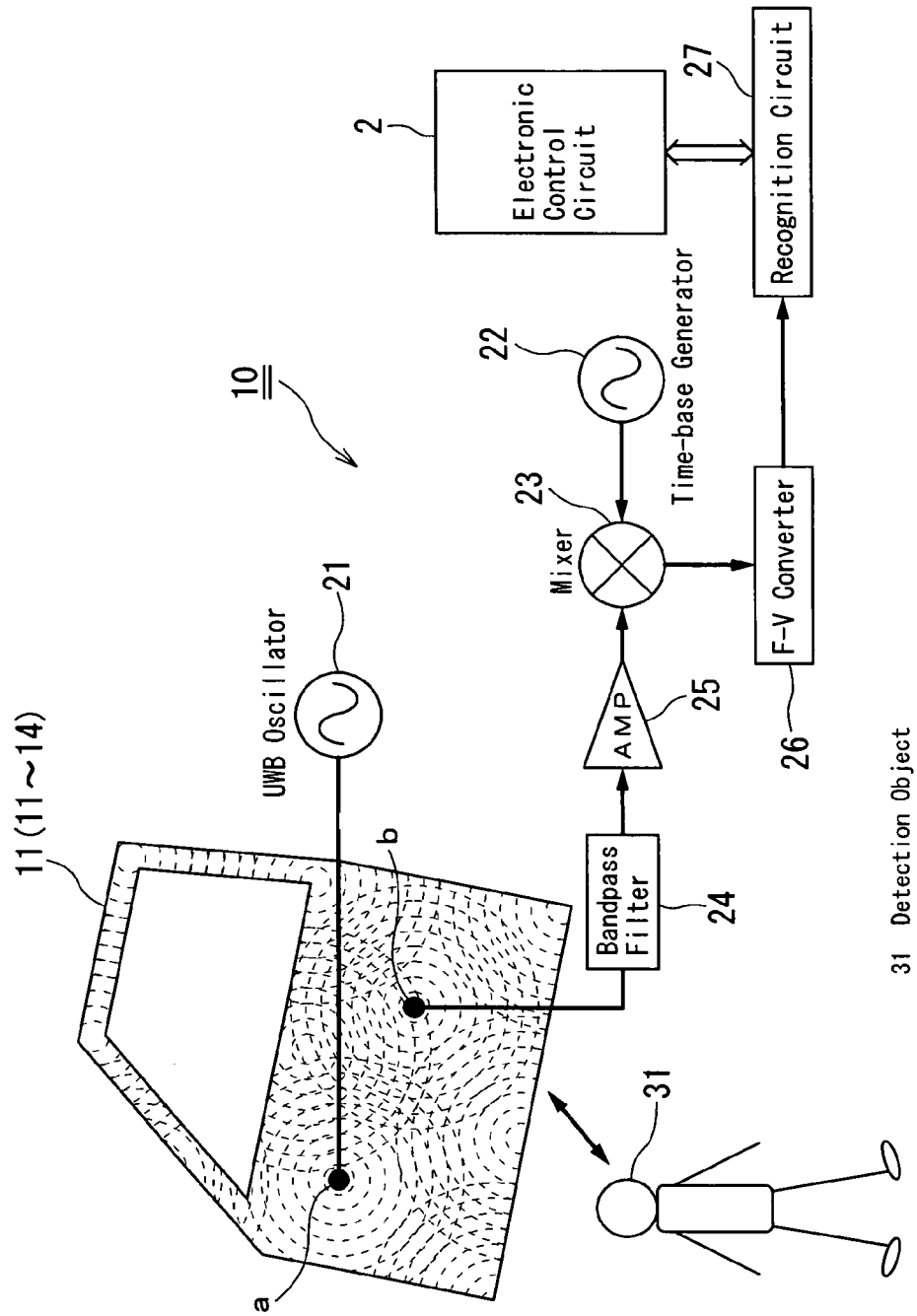
FIG. 2 is a functional block diagram of the proximity sensor of the first embodiment of the present invention.
Figure 6:
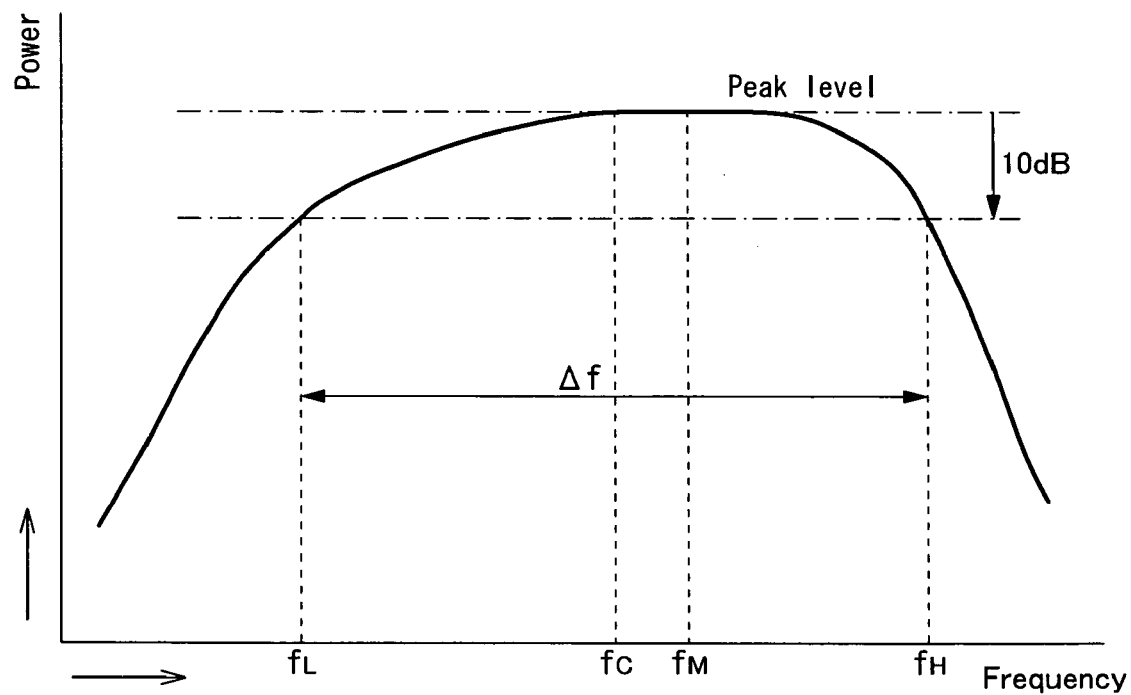
FIG. 6 is a frequency-output curve graph by which FCC (Federal Communications Commission) of the United States defines UWB.

FIG. 1 is a concept view of a total structure of a vehicle installing a proximity sensor of a first or a second embodiment of the present invention and FIG. 2 is a functional block diagram of the proximity sensor of the first embodiment of the present invention. Moreover, FIG. 6 is a frequency-output curve graph by which FCC (Federal Communications Commission) of the United States defines UWB.

In FIG. 1 and FIG. 2, antenna terminals of a UWB oscillator 21 are electrically connected to outer panels 11 to 14 that are composed of metal plates (electrically conductive) of respective doors of a vehicle 1. Such points become feeding points "a" of the outer panels 11 to 14. The outer panels 11 to 14 of the respective doors receive supply of microwaves from the feeding points "a" and act as antennas that radiate the microwaves from their surfaces. The outer panel 11-14 of each of the doors constitutes an electrically conductive member.

The present embodiment is described about a case example in which the outer panel 11-14 of each door becomes the antenna. However, front and rear bumpers, a trunk lid, an engine hood, front doors, back doors, slide doors, swing doors, other movable hoods, sun roofs or the like of the vehicle 1 may be used as the electrically conductive member of the present embodiment as in the outer panels 11 to 14. Among them, each of the front doors, the back door, the slide door, the swing door or the like can be taken as an opening/closing body that is mounted openably and closably on the vehicle.

This UWB oscillator 21 outputs a wideband frequency of microwaves that can be radiated at a frequency of a sufficiently short wavelength from the outer panel 11-14 as the antenna. The UWB (UltraWideBand) is an oscillator that uses a group of impulse trains of a very narrow pulse width as a broadband frequency without using a carrier wave, thereby transmitting a signal without modulation. FCC (Federal Communications Commission) of the United States defines it by the Frequency-Output Curve Graph.

Moreover, the feeding point "a" of the outer panel 11-14 of each of the doors is set at a point that is estimated or corrected and checked by a simulation or by a simulation together with a real machine. A receiving point "b" that receives the microwaves radiated from the outer panel 11-14 of each door so as to detect a propagation state, i.e. an eigenvalue of a radio wave propagation of each frequency. The receiving point "b" is similarly set at a point that is estimated or corrected and checked by a simulation or by a simulation together with a real machine. They are set in the same way in the second embodiment and the subsequent embodiments of the present invention.

The UWB oscillator 21 oscillates the microwaves having the wideband frequency. The UWB oscillator 21 knows the propagation state of the microwaves of the outer panel 11-14 by a change of the eigenvalue of the radio wave propagation of a transfer function or the like of a resonant circuit that is formed by a detection area 11A-14A. The detection area 11A-14A is composed of the outer panel 11-14 acting as the antenna and an electromagnetic wave radiation space accompanying a change of a humidity, a temperature and a barometric pressure around the outer panel 11-14. Specifically, the UWB oscillator 21 can have a plurality of frequencies determined by the detection area 11A-14A made of the electromagnetic wave radiation space and the outer panel 11-14 as a resonant frequency.

Here, the detection area 11A-14A is set at an outside in relation to the outer panel 11-14 with a distance of a half-wavelength of a frequency of the radiated microwaves.

A time-base generator 22 is an oscillator of microwaves of a specific frequency (fo) used for detecting a changing frequency on the basis of the change of the propagation state of the detection area 11A-14A as the electromagnetic wave radiation space. Normally, the time-base generator 22 is an oscillator that oscillates microwaves of a frequency same as or near that of the UWB oscillator 21. An oscillator having a relatively stable oscillating frequency (fo) is used as this time-base generator 22.

A bandpass filter 24 is a filter that selects only a specific frequency with a noise removed. A high-frequency amplifier 25 is an amplifier that amplifies an output of the bandpass filter 24. A mixer 23 makes the outer panel 11-14 function as the antenna so as to radiate microwaves having a sufficiently short wavelength relative to a size of the outer panel 11-14. The mixer 23 mixes a frequency (f), at which an existence of a detection object 31 residing in the detection area 11A-14A is detected at the outer panel 11-14 as the change of the eigenvalue of the radio wave propagation, with the frequency (fo) obtained from the time-base generator 22, thereby making a mixing frequency (mf+nfo; here "m", "n" being an integer of −∞ to +∞). An F-V converter 26 converting a frequency into a voltage detects a pattern of the frequency passed through the bandpass filter 24 as the voltage. The mixer 23 and the F-V converter 26 result in mixing the change of the frequency pattern with the frequency (fo) obtained from the time-base generator 22. Then, a taken-out frequency pattern is detected by the F-V converter 26. Thus, a change of a voltage value corresponding to each of the frequency patterns or a pattern matching of each of the frequency patterns is taken out.

The UWB oscillator 21 has the frequency of the microwaves radiated from the outer panel 11-14 as the antenna of the vehicle 1. The UWB oscillator 21 forms a resonant circuit of the microwaves between the detection object 31 at the detection area 11A-14A being the electromagnetic wave radiation space and the outer panel 11-14. Then, the UWB oscillator 21 supplies a resonant energy to each of resonant frequencies that is determined by the propagation state of the electromagnetic wave radiation space. That is, there takes place a resonant state at a plurality of the resonant frequencies supplied from the UWB oscillator 21, while reflection or absorption is generated at other plural frequencies than those. Then, a fixed value of them becomes one corresponding to each of the frequencies. If the detection object 31 resides in the detection area 11A-14A, the same detection object 31 becomes the antenna and corresponds to the outer panel 11-14 acting as the antenna, so that there is generated a coupling of the antennas with each other.

At this time, in a wavelength component (frequency component) corresponding to a distance from the detection object 31, each of the frequencies changes in such a way as follows. That is, the detection object 31 becomes the antenna and forms the coupling of the mutual antennas together with the outer panel 11-14 functioning as the antenna, thereby having an influence on the plurality of the oscillating frequencies outputted from the outer panel 11-14. Then, each of the frequencies changes into such a frequency as enlarging the amplitude, such a frequency as lessening the frequency or the like by the reflection or absorption of the detection object 31.

For example, the fixed value determined by the outer panel 11-14 becomes the specific frequency pattern that the F-V converter 26 gets as the change of the voltage value corresponding to each of the frequencies when there is no detection object 31. However, if the detection object 31 exists, the eigenvalue of the radio wave propagation is varied by a state change of the detection area 11A-14A as the electromagnetic wave radiation space. Then, the output of the F-V converter 26 becomes a frequency pattern different from the one outputted when the detection object 31 does not exist.

As described above, the frequency range of the UWB oscillator 21 is wide, so that the microwaves radiated from the outer panel 11-14 are to have many resonant frequencies. Standing waves are formed on the outer panel 11-14 by the propagation state of the electromagnetic wave radiation space. Here, when the eigenvalue of the radio wave propagation changes by the existence of the detection object 31, the standing wave formed in the outer panel 11-14 until then changes accordingly.

The mixer 23 mixes the frequency (f) obtained from the UWB oscillator 21 and the frequency (fo) obtained from the time-base generator 22 so as to down-convert them. Then, the frequency pattern is obtained by the F-V converter 26. Moreover, a recognition circuit 27 makes the frequency passed through the bandpass filter 24 into a signal passed through the F-V converter 26 so as to detect the state change of the detection area 11A-14A being the electromagnetic wave radiation space as a difference of he eigenvalue of the radio wave propagation of the microwaves. The detected change of the frequency pattern makes it possible to detect a distance, a dimension or the like by previously measuring a state corresponding to a distance, a dimension or the like as a standard frequency pattern and then estimating the distance, the dimension or the like from the standard frequency pattern.

Accordingly, if a human or the like comes near, there is generated a mutual coupling of the antennas to the outer panel 11-14 that is deemed as the antenna. Then, the eigenvalue of the radio wave propagation of each of the frequencies becomes different from a change of the eigenvalue of each of the frequencies until then in case there is no human or the like. Consequently, it is possible to detect it as the change of the frequency pattern.

That is, an information of the detection object 31 such as the human, an object, a dimension or the like at this time is determined while compared with the standard frequency pattern that maps characteristics thereof inside the recognition circuit 27. This method can distinguish a change at the time of an automatic opening and closing operation of the door from an access of the detection object 31 such as the human, the object or the like.

Moreover, the recognition circuit 27 inputs its output into an electronic control circuit 2. The electronic control circuit 2 of the present embodiment is composed of a microcomputer executing an obstacle detection of a door opening/closing system. The control circuit 2 decides if the door can be opened and closed safely and if there is no obstacle when the door is opened and closed. The control circuit 2 makes the door opening and closing stop or makes an alarm sound generate inside the vehicle 1 when it detects a human or a structure.

Here, the UWB oscillator 21, the time-base generator 22, the mixer 23, the bandpass filter 24 and the F-V converter 26 constituting the proximity sensor 10 of the present embodiment are built in between the outer panel 11-14 and an inner panel (not shown) of each door of the vehicle 1. Then, the output of the F-V converter 26 is inputted into the recognition circuit 27 and the electronic control circuit 2. In the present embodiment, the electronic control circuit 2 is the microcomputer that executes an obstacle detecting device of the door opening/closing system.

As described above, the present embodiment of the proximity sensor 10 has the electrically conductive member composed of the outer panel 11-14 mounted integrally or separably on the vehicle 1, the detection area 11A-14A set at the outside of the outer panel 11-14, the UWB oscillator 21 outputting the wideband frequency that feeds the microwaves to the outer panel 11-14, the mixer 23 removing a noise via the bandpass filter 24 at the receiving point "b" different from the feeding point "a" of the UWB oscillator 21 in the electrically conductive member compose of the outer panel 11-14 and inputting the frequency of the time-base generator 22 for down-conversion so as to mix them, and the recognition circuit 27 recognizing the change of the detection area 11A-14A by the pattern of the frequency passed through the mixer 23.

The proximity sensor 10 of the present embodiment constructed as above operates as follows.

First, the UWB oscillator 21 supplies the wideband microwaves to the outer panel 11-14 of each door of the vehicle 1 and the detection area 11A-14A that form the resonant circuit. The eigenvalue of the radio wave propagation is a value decided by a relation between the detection area 11A-14A and the outer panel 11-14 and the detection object 31. The eigenvalue of the radio wave propagation of each frequency radiated from the outer panel 11-14 changes depending on existence and non-existence of the detection object 31.

Specifically, the resonant circuit composed of the outer panel 11-14 and the detection object 31 in the detection area 11A-14A resonates by the microwaves given from the UWB oscillator 21. Then, if there is no detection object 31 that generates reflection or absorption in the detection area 11A-14A, the resonant circuit becomes the eigenvalue of the radio wave propagation of the plurality of the specific frequencies.

On the other hand, if the detection object 31 comes near the outer panel 11-14, the microwaves are reflected or absorbed at the detection object 31. Then, the resonant circuit composed of the outer panel 11-14 and the detection object 31 in the detection area 11A-14A presents itself as the eigenvalue of the radio wave propagation of the microwaves that is different from the one at the time when the detection object 31 does not exist. For example, if the detection object 31 exists in the detection area 11A-14A, the propagation state of the frequency supplied from the UWB oscillator 21 is different from the one at the time when the detection object 31 does not exist. This difference is passed through the bandpass filter 24 for removing the noise so that only a predetermined band of frequency is taken out. Then, the taken-out frequency is introduced in the mixer 23 together with the output frequency (fo) of the time-base generator 22. They are mixed and down-converted by the mixer 23 so as to be the mixing frequency (f+fo). The mixing frequency (f+fo) is inputted in the F-V converter 26 and detected there as the frequency pattern based upon the fixed value.

In detecting the mixing frequency (f+fo), the difference of the pattern of the frequency obtained by passing the frequency, which passed through the bandpass filter 24, through the F-V converter 26 is recognized as the change of the state of the detection area 11A-14A by the recognition circuit 27. Thus detected change of the pattern of the frequency enables the detection of the distance, the dimension of the like by measuring beforehand the standard frequency pattern corresponding to the distance, the dimension or the like and estimating the distance, the dimension or the like on the basis of that standard frequency pattern. Moreover, the standard frequency pattern enables the detection of a moving speed and a distance of the detection object 31 on the basis of its changing speed.

The UWB oscillator 21 is made into the oscillator that oscillates the microwaves having the wideband working frequency. Therefore, the UWB oscillator 21 can select a plurality of frequencies that can be radiated from the outer panel 11-14 at low costs, thereby being able to make the whole device low-priced. Moreover, the antenna of the present embodiment is made of the outer panel 11-14 of the door of the vehicle 1. The opening and closing of the door causes the change of the state of the detection area 11A-14A composed of the electromagnetic wave radiation space accompanying the change of the humidity, the temperature and the barometric pressure of the outside of the outer panel 11-14. In this case, the UWB oscillator 21 oscillating the wideband microwaves can radiate the plurality of the frequencies, so that it can detect the detection object 31 at the detection area 11A-14A with accuracy, too. Particularly, the one having the antenna made of the door of the vehicle 1 can be used as a sensor of a security system, a keyless entry system or the like. Moreover, the detection area 11A-14A can be set within a range about 30 cm or less from the outer panel 11-14 of the door of the vehicle 1 by selecting the frequency band of the UWB oscillator 21. Accordingly, it is possible to set a field of the electromagnetic wave radiation space within a range of 30 cm or less from the outer panel 11-14 of the door of the vehicle 1.

The proximity sensor of the first embodiment forms the resonant circuit of the microwaves between the outer panel 11-14 and the detection object 31 in the detection area 11A-14A. Thereby, the mutual influence of the electric field and the magnetic field of the electromagnetic waves becomes larger, while the sensor becoming hard to be affected by the electrostatic capacity of the detection object in the detection area 11A-14A. Consequently, the detection accuracy improves. Particularly, the proximity sensor of the present embodiment enables the detection free from the influence by the atmosphere such as the humidity, the temperature, the moisture, the pressure or the like of the detection area in comparison with the conventional type of the electrostatic capacity sensing system. Therefore, the device becomes low-priced. Moreover, the UWB oscillator 21 radiates the plurality of the frequencies. Thus, if the feeding point "a" and the receiving point "b" are set while utilizing a result of a simulation, it can surely pick up the radiation waves from the electrically conductive member composed of the outer panel 11-14. As a result, the detection at short range is easily done and the detection of the state can be performed while being manufactured at low costs.

Second Embodiment

The above-mentioned first embodiment has the feeding point "a" and the receiving point "b" as a pair. However, in practicing the invention, feeding/receiving points are not restricted to the pair of the feeding point "a" and the receiving point "b". The receiving points "b" may be plural as in the present embodiment.

Figure 3:
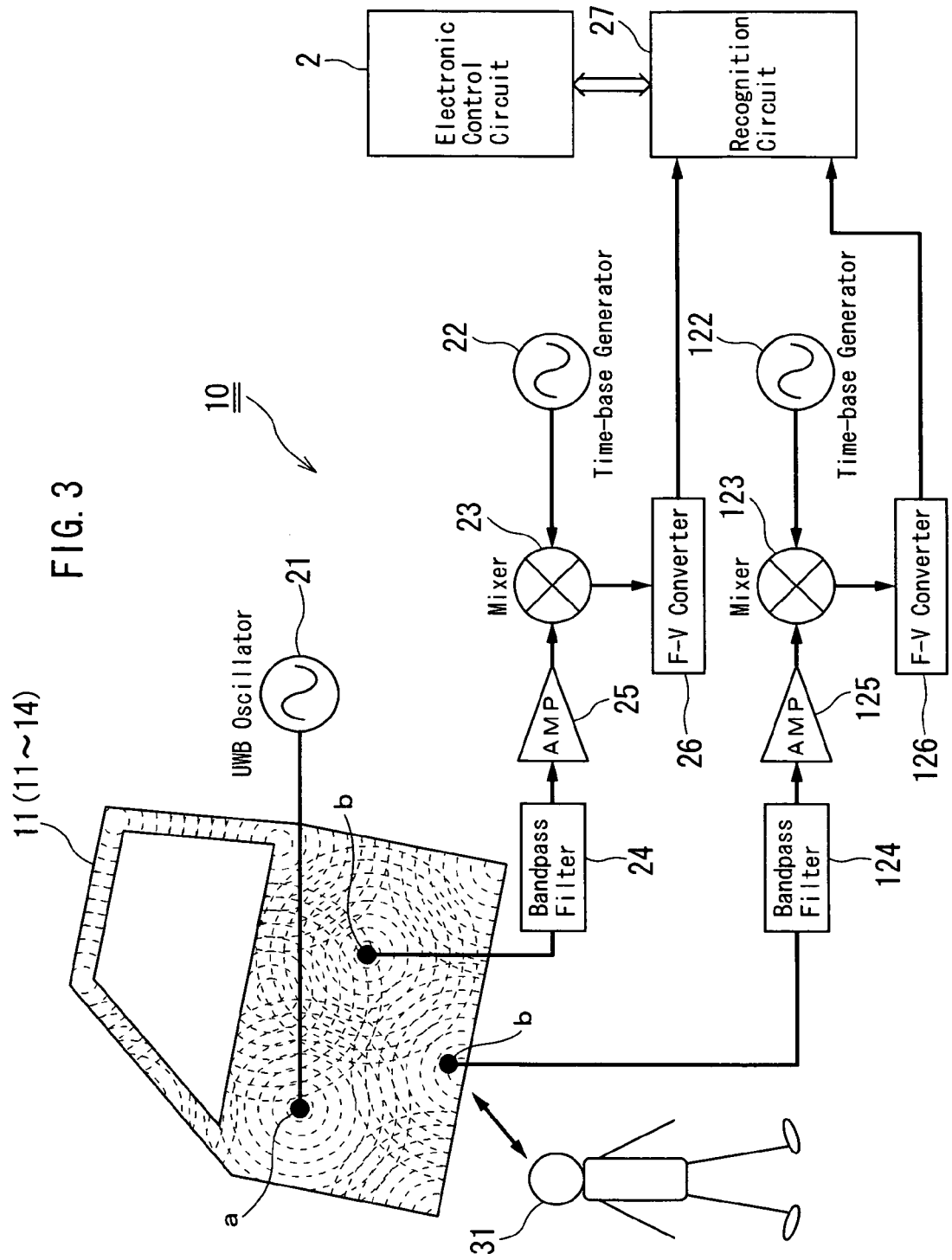
FIG. 3 is a functional block diagram of a proximity sensor of a second embodiment of the present invention.

FIG. 3 is a functional block diagram of a proximity sensor of a second embodiment of the present invention.

A proximity sensor 10 of the present second embodiment disposes two receiving points "b" on the electrically conductive member composed of the outer panel 11-14 in the circuit configuration of the first embodiment. Provided on each of these receiving points "b" are a mixer 123 removing a noise via a bandpass filter 124 for amplifying by a high-frequency amplifier 125 and inputting a frequency of a time-base generator 122 for down-conversion for mixing, and the recognition circuit 27 recognizing a change of the detection area 11A-14A on the basis of a pattern of a frequency passed through the mixer 123. A basic circuit configuration added in the second embodiment is the same as the circuit configuration of the first embodiment, that is, the time-base generator 21, the mixer 23, the bandpass filter 24, the high-frequency amplifier 25, the F-V converter 26 and the recognition circuit 27.

The embodiment of FIG. 3 shows an example in which a plurality of (two) receiving points "b" are provided on the electrically conductive member made of the outer panel 11-14. Providing the plurality of (two or more) receiving points "b" on the outer panel 11-14 as described above improve the detection resolution more and can ensure the S/N ratio. In this embodiment, two receiving points "b" are provided. Therefore, it can detect a difference of two fixed values, thereby improving the detection resolution more than the detection resolution when one receiving point "b" is provided. Of course, if the receiving points "b" are provided in a number of two or more, the detection resolution improves more accordingly.

As in the present embodiment, if the size of the outer panel 11-14 is large, it is possible that, e.g. in case of the pair of the feeding point "a" and the receiving point "b", a distance of the electromagnetic waves radiated from the feeding point "a" and coming back again (to the receiving point "b") becomes long thereby attenuating a signal. In contrast, providing the plurality of the receiving points "b" can make sensitivity improved more and the S/N ratio good.

Third Embodiment

The above-mentioned first embodiment has the pair of the feeding point "a" and the receiving points "b". However, in practicing the present invention, a feeding point "a" and a receiving point "b" can be made common. Moreover, while the proximity sensor 10 of the aforementioned first embodiment detects the existence of the detection object 31, it may detect a movement of the detection object 31.

Figure 4:
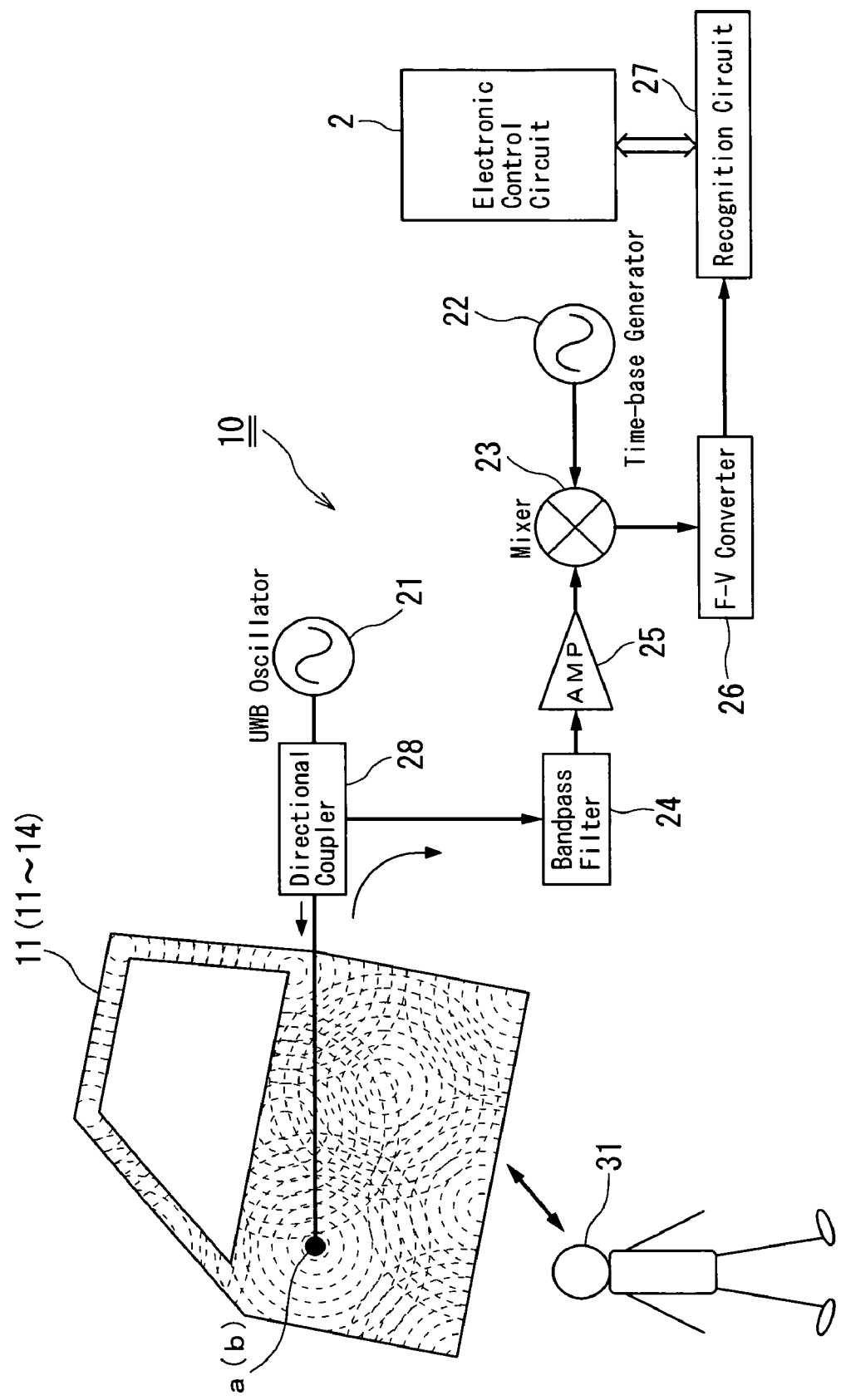
FIG. 4 is a functional block diagram of a proximity sensor of a third embodiment of the present invention.

FIG. 4 is a functional block diagram of a proximity sensor of a third embodiment of the present invention.

This third embodiment uses a directional coupler 28 so as to make it possible to provide only a single feeding point "a" ("b") in contrast with a constitution having the feeding point "a" and the receiving point "b".

In FIG. 4, the directional coupler 28 is a circuit that supplies the output of the UWB oscillator 21 to the outer panel 11-14 and that does not transmit an overlapped frequency to the UWB oscillator 21 but transmits to the bandpass filter 24. That is, the directional coupler 28 is a circuit preventing an output frequency of the UWB oscillator 21 from being changed by the output of the UWB oscillator 21 that is reflected from the feeding point "a" or supplied to the feeding point "a" serving also as the receiving point "b" so as to be overlapped with the outer panel 11-14.

The proximity sensor 10 according to the present third embodiment can be constructed as the embodiment that has the UWB oscillator 21 supplying the wideband frequency of the microwaves at a frequency of sufficiently short wavelength relative to a size of the outer panel 11-14 from the outer panel 11-14 as the antenna, the mixer 23 removing the noise via the directional coupler 28 and the bandpass filter 24 from the same feeding point "a" as the feeding point "a" of the UWB oscillator 21 in the outer panel 11-14 thereby to input the frequency outputted from the time-base generator 22, which oscillates the down-converting frequency for mixing, while detecting a Doppler frequency, and the recognition circuit 27 recognizing the change of the detection area 11A-14A by each of the patterns of the frequencies passed through the mixer 23.

Accordingly, the proximity sensor 10 of the aforementioned third embodiment forms a resonant circuit between the detection object 31 in the detection area 11A-14A and the electrically conductive member made of the outer panel 11-14 when the microwaves are supplied from the UWB oscillator 21 to the outer panel 11-14. Then, it resonates at each of the plurality of the frequencies on the basis of an eigenvalue of a radio wave propagation corresponding to each of the frequencies that are set at the detection area 11A-14A and the outer panel 11-14. First, the recognition circuit 27 records a frequency pattern obtained at this time from the outer panel 11-14 on the basis of the eigenvalue of the radio wave propagation in case there is no detection object 31 that generates reflection in the detection area 11-14A. If the detection object 31 such as a human comes near the outer panel 11-14, the resonant frequency of the resonant circuit, which is formed by the outer panel 11-14 and the detection object 31 in the detection area 11A-14A, changes due to the difference of the eigenvalue of the radio wave propagation corresponding to each of the frequencies in the detection area 11A-14A made of the electromagnetic wave radiation space. At this time, there is generated at the outer panel 11-14 a standing wave caused by each of frequency (wavelength) components based upon the difference of the eigenvalue of the radio wave propagation affected by the detection object 31 such as a human.

The plurality of the frequencies overlapped on the outer panel 11-14 is taken out through the bandpass filter 24 and amplified by the high-frequency amplifier 25. Then, the taken-out frequency is mixed with the output frequency of the time-base generator 22 and down-converted by the frequency of the time-base generator 22 so as to make a change of the frequency as an output of the F-V converter 26. The recognition circuit 27 compares the frequency pattern detected as the output of the F-V converter 26 with a previously known standard frequency pattern so as to determine a distance, a dimension or the like on the basis of its reference or standard signal. Moreover, the recognition circuit 27 can detect a moving speed of the detection object 31 based on the Doppler shift of an individual frequency of the change of the standard frequency pattern.

Fourth Embodiment

While the aforementioned first embodiment to the third embodiment of the proximity sensors 10 detect the existence of the detection object 31, it is possible to detect a movement of the detection object 31.

Figure 5:
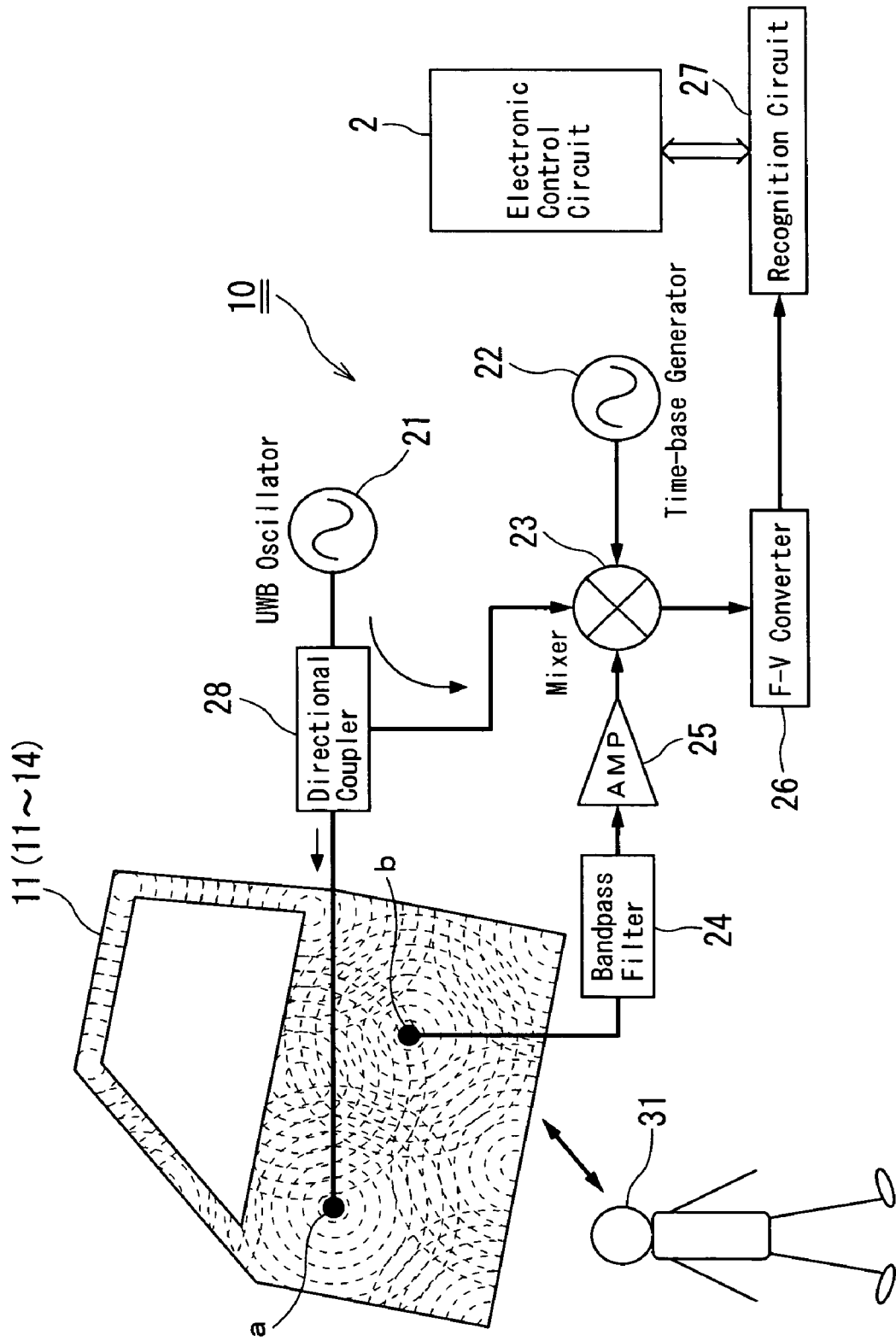
FIG. 5 is a functional block diagram of a proximity sensor of a fourth embodiment of the present invention.

FIG. 5 is a functional block diagram of a proximity sensor of a fourth embodiment of the present invention.

The proximity sensor 10 according to the fourth embodiment can be constructed as an embodiment that has the UWB oscillator 21 supplying the wideband frequency of microwaves from the outer panel 11-14 as the antenna at the frequency of sufficiently short wavelength relative to the size of the outer panel 11-14, the mixer 23 removing the noise via the bandpass filter at a feeding point "b", which is different from the feeding point "a" of the UWB oscillator 21 on the outer panel 11-14, and inputting the frequency the output frequency of the UWB oscillator 21 via the time-base generator 22 oscillating the down-converting frequency and the directional coupler 28 for mixing while detecting the Doppler frequency, and the recognition circuit 27 recognizing a change of a propagation state of the detection area 11A-14A based on a predetermined band of frequency passed through the mixer 23.

Accordingly, the aforementioned fourth embodiment of the proximity sensor 10 forms a resonant circuit of microwaves between the detection object 31 in the detection area 11A-14A and the outer panel 11-14 if the microwaves are supplied from the UWB oscillator 21 to the outer panel 11-14. Then, it resonates at each of a plurality of frequencies set by the detection area 11A-14A and the outer panel 11-14. The recognition circuit 27 records a frequency pattern obtained from the outer panel 11-14 on the basis of a fixed value corresponding to each frequency obtained when there is no detection object 31 that generates reflection in the detection area 11A-14A. If the detection object 31 comes near the outer panel 11-14, there is generated a difference in an eigenvalue of a radio wave propagation of each frequency in the electromagnetic wave radiation space. Then, the frequency pattern of the resonant circuit formed by the outer panel 11-14 and the detection object 31 in the detection area 11A-14A changes. At this time, a standing wave of a frequency (wavelength) component is generated on the outer panel 11-14 on the basis of the difference of the eigenvalue of the radio wave propagation that is affected by the detection object 31 such as a human. A frequency overlapped on the outer panel 11-14 at this time is taken out through the bandpass filter 24. Then, the taken-out frequency is mixed with the output frequency of the UWB oscillator 31 so as to take out a Doppler frequency component between the both frequencies and to down-convert them by the frequency of the time-base generator 22. An obtained frequency change is determined by the frequency pattern corresponding to each frequency of an output of the F-V converter 26. The recognition circuit 27 compares a detected frequency pattern with a previously known frequency pattern so as to detect a distance, a dimension or the like based on its reference signal. Moreover, the recognition circuit 27 can detect a moving speed of the detection object 31 based on the Doppler frequency.

The recognition circuit 27 may be any one as long as it performs pattern recognition of the change of the detection area 11A-14A as the aforementioned electromagnetic wave radiation space, detects the distance or the dimension or the like by comparing the frequency pattern with the standard frequency pattern corresponding to the known distance, dimension or the like and is constituted by an analog circuit or a digital circuit detecting the moving speed of the detection object 31 by the Doppler shift of the individual frequency of that frequency pattern.

Here, the proximity sensor 10 of the present first to fourth embodiment has the UWB oscillator 21 outputting the wideband frequency of the microwaves radiated from the outer panel 11-14 as the antenna at the frequency of the sufficiently short wavelength relative to the size of the outer panel 11-14. The proximity sensor 10 forms the resonant circuit between the outer panel 11-14 and the detection object 31 in the detection area 11A-14A. Then, the proximity sensor 10 detects the change of the detection area 11A-14A as the change of the frequency pattern on the basis of the propagation state of the frequency supplied from the feeding point of the UWB oscillator 21.

Accordingly, the UWB oscillator 21 having the frequency of the microwaves supplied from the outer panel 11-14 of the vehicle 1 as the antenna forms the resonant circuit of the microwaves between the detection object 31 in the detection area 11A-14A as the electromagnetic wave radiation space so as to radiate the microwaves from the outer panel 11-14. Then, there takes place a difference in the eigenvalue of the radio wave propagation corresponding to the specific frequency depending on whether there is a detection object 31 generating the reflection or the absorption or not. Moreover, if the detection object 31 such as a human comes near the outer panel 11-14, the electric field and the magnetic field of the radiated electromagnetic waves is reflected or absorbed at the detection object 31. That is, the eigenvalue of the radio wave propagation in the electromagnetic wave radiation space changes in comparison with a time when the detection object 31 such as a human is distant and stands still. Therefore, it is grasped as the difference of the Doppler shift of the individual frequency of the frequency pattern. Consequently, it is possible to determine the access speed and the distance of the detection object 31 by deciding the frequency pattern.

Here, the present embodiment of the proximity sensor 10 is used for the vehicle 1. Therefore, there are many components that can be used as the electrically conductive member such as the outer panel 11-14 of the door. Moreover, it is possible to use other components. Consequently, it is preferable to use it for the vehicle.

Fifth Embodiment

While the proximity sensors 10 of the aforementioned first embodiment to the fourth embodiment use the UWB oscillator 21, it is possible to substitute it with an output oscillator that oscillates microwaves of 300 MHz to 300 GHz. Then, a resonant circuit of microwaves including the detection area 11A-14A and the detection object 31 at the detection area 11A-14A becomes a microwave oscillating portion 30.

Figure 7:
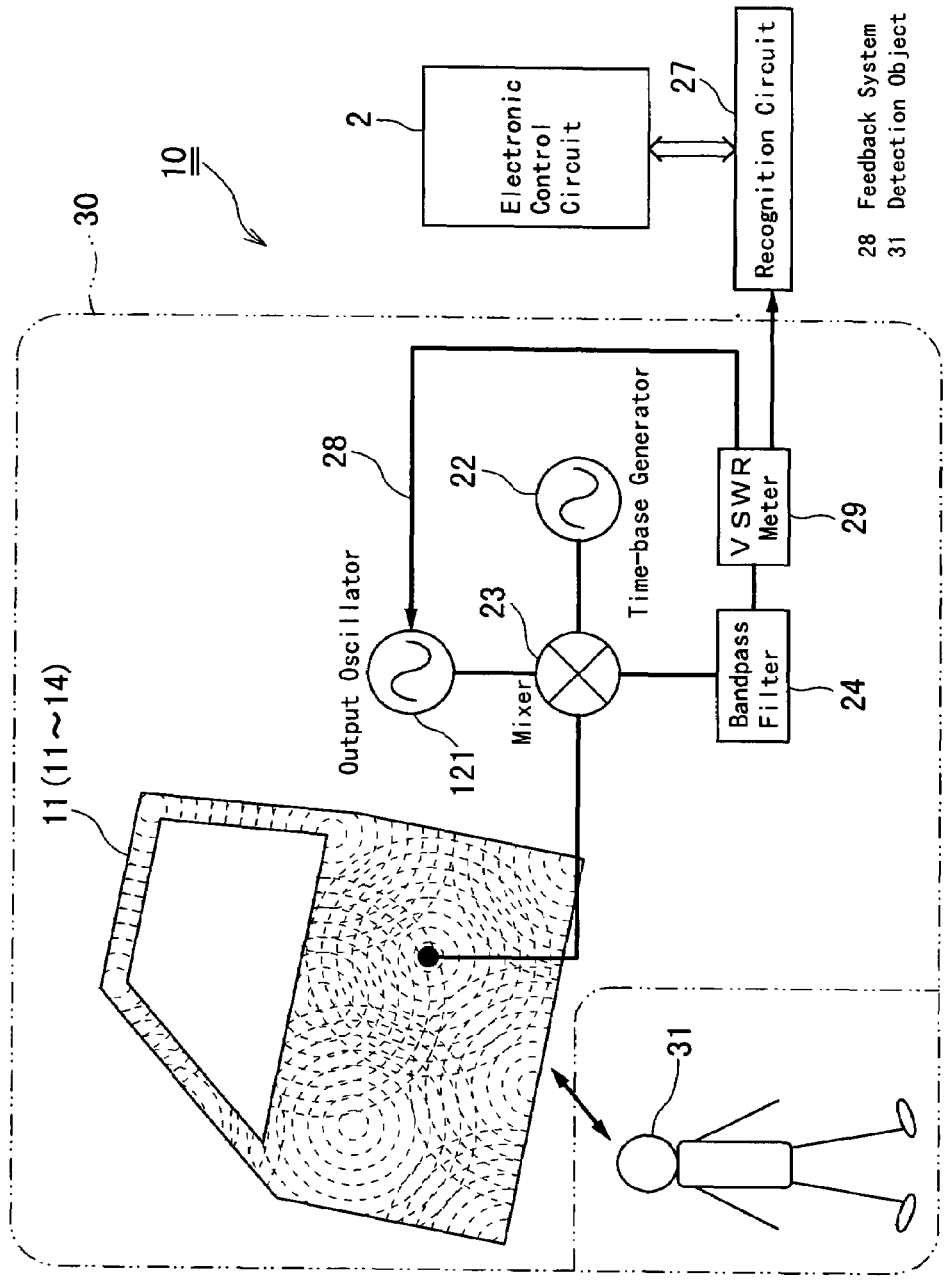
FIG. 7 is a functional block diagram of a proximity sensor of a fifth embodiment of the present invention.

FIG. 7 is a functional block diagram of a proximity sensor of a fifth embodiment of the present invention.

In FIG. 7, an output oscillator 121 oscillating the microwaves at a frequency of 300 MHz to 300 GHz radiate the microwaves from the outer panel 11 functioning as the antenna so as to detect a change of a propagation state of the detection area 11A-14A as the electromagnetic wave radiation space around the outer panel 11-14. The electromagnetic wave radiation space fixed by the detection area 11A-14A and the outer panel 11-14 has a specific resonant frequency based upon an eigenvalue of a radio wave propagation corresponding to a plurality of frequencies. Therefore, a separately-excited microwave generator capable of controlling an oscillating frequency from another part is used as the output oscillator 121.

The output oscillator 121 in case of embodying the present invention is able to deal with the reflection and absorption of an oscillating frequency (f) by a change of the detection area 11A-14A as the electromagnetic wave radiation space. An output of the output oscillator is electrically connected to the feeding point "a" of the outer panel 11-14 via the mixer 23. Here, the detection area 11A-14A is set at an outside at a half-wavelength distance of the frequency of the radiated microwaves relative to the outer panel 11-14.

The bandpass filter 24 is a filter that chooses only one mixing frequency (f+fo). Moreover, a VSWR meter 29 detects VSWR of a frequency passed through the bandpass filter 24. As a result, the mixer 23 mixes the frequency (f) obtained from the output oscillator 121 and a frequency overlapped on the outer panel 11-14 with a frequency (fo) obtained from the time-base generator 22 for down-conversion. Then, a change of the frequency of the output oscillator 121 is taken out as a frequency of a variation difference via the bandpass filter 24. Thereafter, a standing wave of such taken-out frequency is detected by the VSWR meter 29.

At this time, the frequency supplied to the outer panel 11-14 from the output oscillator 121 is normally set at such a frequency that, if it is outputted efficiently from the outer panel 11-14, an overall standing wave ratio becomes small. Describing it just to be sure, the VSWR of the frequency, which passed through the bandpass filter 24 in case there is no detection object 31, is normally set to a minimum for the purpose of improving a radiation efficiency of the microwaves radiated from the outer panel 11-14. However, in case of embodying the present invention, it is not a prerequisite to make the aforesaid VSWR to the minimum.

Still, the state change of the detection area 11A-14A as the electromagnetic wave radiation space presents itself as a shift in frequency matching between the outer panel 11-14 and the detection area 11A-14A. Detection of this matching is set such that, when there is no detection object 31, the VSWR meter 29 is monitored so as to minimize the VSWR.

That is, the outer panel 11-14 and the detection area 11A-14A is to constitute the microwave oscillating portion 30 that forms the resonant circuit of the microwaves, including the detection object 31 in the detection area 11A-14A, with the outer panel 11-14 as the antenna at a specific frequency of a sufficiently short wavelength in relation to the size of the outer panel 11-14.

As described above, there are many frequencies of the microwaves radiated from the outer panel 11-14. The frequency band of the output oscillator 121 include part or all or the frequencies of the radiated microwaves. The mixer 23 mixes and down-converts the frequency (f) obtained from the output oscillator 121 and the frequency (fo) obtained from the time-base generator 22, thereby measuring its VSWR by the VSWR meter 29.

In addition, the recognition circuit 27 distinguishes the state change of the detection area 11A-14A as the electromagnetic wave radiation space by a signal passed through the VSWR meter 29 that detects the VSWR of the frequency passed through the bandpass filter 24. Thus detected signal change serves for detection of the distance, the dimension or the like by measuring a standard or reference information in advance about a signal state corresponding to the distance, the dimension or the like and estimating the distance, the dimension or the like based upon the standard information.

That is, the information such as a human, an object, a dimension or the like as the detection object 31 is detected at that time by comparing and referring to data that map those properties inside the recognition circuit 27. This method can differentiate the change when the door is automatically opened or closed from an access of the human or the object. Moreover, the recognition circuit 27 inputs its output into the electronic control circuit 2.

At this time, the output oscillator 121, the time-base generator 22, the mixer 23, the bandpass filter 24 and the VSWR meter 29 constituting the proximity sensor of the present embodiment are built in between the outer panel 11-14 of each door of the vehicle 1 and the inner panel (not shown). Then, the output of the VSWR meter 29 is inputted into the recognition circuit 27 and the electronic control circuit 2. The electronic control circuit 2 is a microcomputer that executes an obstacle detecting device in the present embodiment.

The proximity sensor 10 of the present embodiment has the output oscillator 121 oscillating the microwaves at the frequency of the sufficiently short wavelength relative to the size of the outer panel 11-14 by the resonant circuit composed of the outer panel 11-14 and the detection object 31 at the detection area 11A-14A, the time-base generator 22 oscillating the microwaves for obtaining the mixing frequency, the mixer 23 mixing the frequency obtained from the time-base generator 22 with the output frequency obtained by the microwaves obtained from the output oscillator 121 through the outer panel 11-14 and the detection area 11A-14A so as to detect the predetermined frequency, the bandpass filter 24 selecting only the specific frequency from the frequencies detected at the mixer 23, a feedback system 28 for the output oscillator 121 determining a specific frequency radiated from the outer panel 11-14 by the standing wave of the frequency passed through the bandpass filter 24, and the recognition circuit distinguishing the change of the detection area 11A-14A by the standing wave of the frequency passed through the bandpass filter 24.

Here, in the present embodiment of the proximity sensor 10, the output oscillator 121, the time-base generator 22, the mixer 23, the bandpass filter 24, the VSWR meter 29 and the feedback system 28 constitute the microwave oscillating portion 30 for obtaining the resonance between an electrically conductive panel composed of the outer panel 11-14 and the detection area 11A-14A as the electromagnetic wave radiation space by the standing wave of the frequency passed through the bandpass filter 24. The microwave oscillating portion 30 supplies the frequency of the sufficiently short wavelength relative to the size of the electrically conductive panel composed of the outer panel 11-14 and the detection object 31 at the detection area 11A-14A as the electromagnetic wave radiation space.

Thus, the present embodiment of the proximity sensor 10 has the microwave oscillating portion 30 forming the resonant circuit of the microwaves, including the detection object 31 at the detection area 11A-14A, by the electrically conductive panel composed of the outer panel 11-14 as the antenna with the specific frequency of the sufficiently short wavelength in relation to the size of the electrically conductive panel composed of the outer panel 11-14.

The present embodiment of the proximity sensor 10 constructed as mentioned above operates as follows.

The present embodiment of the proximity sensor 10 forms the microwave circuit, including the detection object 31 at the detection area 11A-14A, by the outer panel as the antenna with the specific frequency of the sufficiently short wavelength in relation to the size of the outer panel 11-14. When the microwaves oscillate, several standing waves are generated on the outer panel 11-14 on the basis of the eigenvalue of the radio wave propagation corresponding to each of the frequencies. Even if the oscillating frequency is radiated as the electromagnetic waves from the outer panel 11-14, there is no change in the electromagnetic wave radiation space in case the detection object 31 does not exist. Then, the frequency variation of the oscillating frequency at that time is determined by conditions of performance. However, if the detection object 31 such as a human comes near the outer panel 11-14 or exists there, the electric field of the electromagnetic wave radiation space is reflected or absorbed at the detection object 31. Consequently, the field of the electromagnetic wave radiation space of the detection area 11A-14A changes.

Thus, in the relation between the detection area 11A-14A, the outer panel 11-14 and the detection object 27 such as a human, the output of the output oscillator 121 changes at the specific frequency radiated from the outer panel 11-14 forming a cavity oscillating circuit. As described above, a mutual influence of the electric field and the magnetic field of the microwaves is larger than an influence of an electrostatic capacity of the detection object 31 in a circuit configuration, which is capable of forming the resonant circuit of the microwaves corresponding to a relative distance between the detection object 31 and the outer panel 11-14. Therefore, the circuit configuration can be deemed as a resonant circuit of the electric field intensity (magnetic field) between the outer panel 11-14 and it and is hard to be affected by the electrostatic capacity of the detection object 31 in the electromagnetic wave radiation space.

Even if the frequency of the output oscillator 121 is radiated as the microwaves from the outer panel 11-14, there takes place no frequency variation in the output oscillator 121 in case the detection object 31 generating the reflection or absorption inside the detection area 11A-14A. However, if the detection object 31 such as a human comes near the outer panel 11-14 or the detection object 31 exists there, the microwaves are reflected or absorbed at the detection object 31, so that the field of the electromagnetic wave radiation space changes. At this time, if a wavelength component (frequency), which corresponds to the distance from the detection object 31, of the reflected waves returning to the outer panel 11-14 is a frequency close to the frequency of the output oscillator 121 outputted from the outer panel 11-14, there takes place a state in which many kinds of frequency components exist. However, it really changes into one frequency (f) as the frequency of a resonant phenomenon. A frequency obtained by introducing the output frequency (fo) of the time-base generator 22 into the mixer 23 and down-converting this frequency change by mixing of this mixer 23 becomes a mixing frequency (mf+nfo). For the mixing frequency (nf+nfo) from the mixer 23, a frequency of a variation difference, i.e. a mixing frequency (f+fo) is taken out through the bandpass filter 24 and a standing wave of the taken-out mixing frequency (f+fo) is detected by the VSWR meter 29.

Thus detected mixing frequency (f+fo) of the VSWR meter 29 is distinguished by the recognition circuit 27 on the basis of the state change of the detection area 11A-14A based upon a size of a signal passed through the VSWR meter 29 that detects the VSWR of the frequency passed through the bandpass filter 24. Thus detected signal change serves for detection of a distance, a dimension or the like by measuring a standard information of a signal state corresponding to the distance, the dimension or the like and estimating the distance, the dimension or the lie based upon that standard information.

Particularly, the output oscillator 121 is made of an oscillator that oscillates the microwaves of a working frequency of 300 MHz to 300 GHz. Consequently, it is possible to radiate the microwaves at low costs and an overall device can be made low-priced. Moreover, the present embodiment of the antenna is made of the outer panel 11-14 of the door of the vehicle 1.

Here, the present embodiment of the proximity sensor 10 is used for the vehicle. Therefore, there are many components usable as the electrically conductive member such as the outer panel 11-14 of the door and other components are also usable. Consequently, it is preferable to use it for the vehicle.

Sixth Embodiment

The aforementioned first embodiment to the fifth embodiment of the proximity sensors 10 describe, as an example, the one having a wideband of an output frequency such as the UWB oscillator 21 or the one that feeds it back positively to the oscillating frequency so as to generate the oscillating frequency change such as the output oscillator 121. However, it can be embodied into an oscillator that has an output oscillator oscillating microwaves of 300 MHz to 300 GHz easy to be affected to a negative side.

Figure 8:
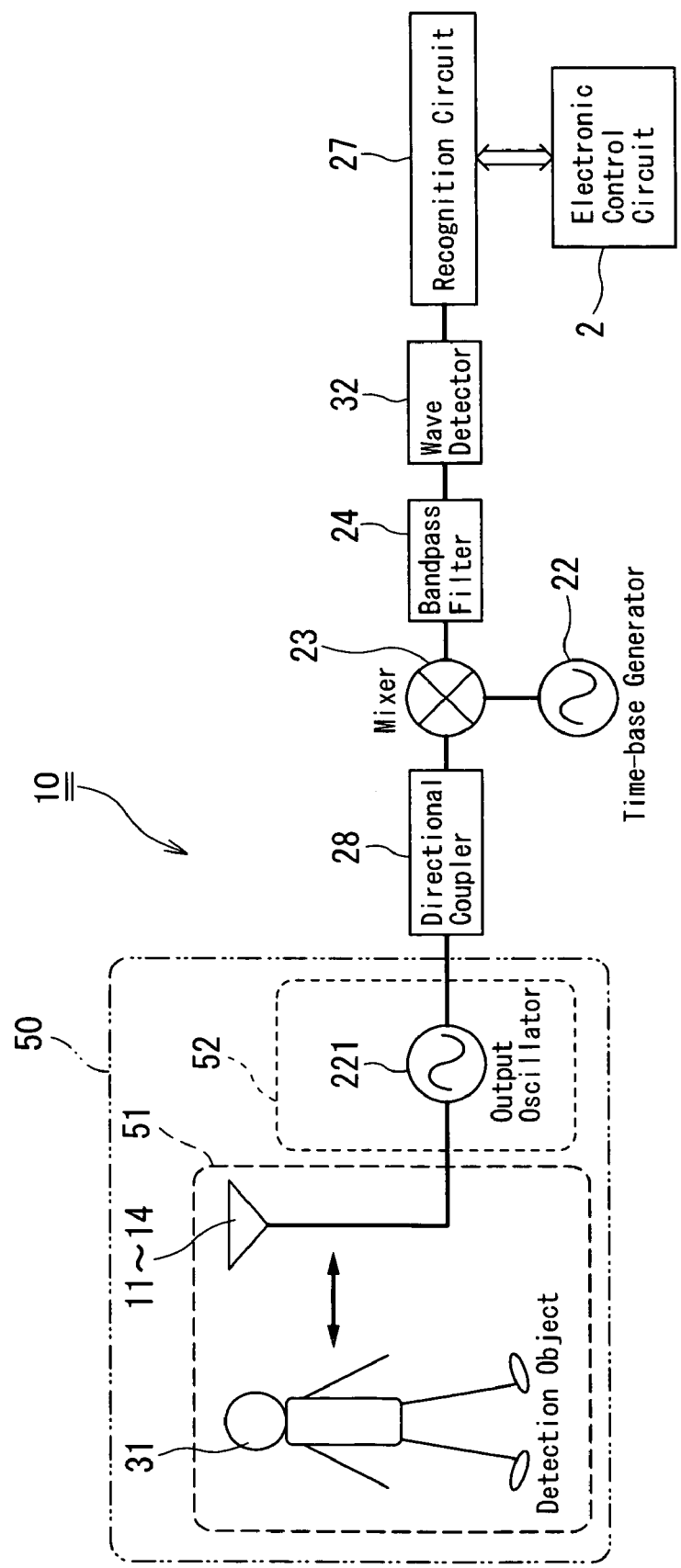
FIG. 8 is a functional block diagram of a proximity sensor of a sixth embodiment of the present invention.

FIG. 8 is a functional block diagram of a proximity sensor of a sixth embodiment of the present invention.

An output oscillator 221 is an oscillator that oscillates microwaves of a frequency of 300 MHz to 300 GHz. The output oscillator 221 is capable of shifting the frequency to such a degree that it can determine whether a detection object 31 such as a human, an object or the like exists or not in the detection area 11A-14A set around the outer panel 11-14 by radiating the microwaves from the outer panel 11-14 acting as the antenna.

Specifically, this output oscillator 221 uses a dielectric oscillator (DRO) or an LC oscillator that is easy to change an oscillating frequency by an outside factor, i.e. that is easy to synchronize with the outside factor while having no PLL circuit or the like. An antenna terminal of the output oscillator 221 is electrically connected to a feeding/receiving point of the outer panel 11-14. Accordingly, the output oscillator 221 can obtain a change of its wavelength, namely a shift of an oscillating frequency of the output oscillator 221, a change of an amplitude of the frequency or the like by a state change of the detection area 11A-14A.

Next described is an effect of the state change of the electromagnetic wave radiation space exercised on a change of a frequency such as the change of the amplitude of the frequency.

The outer panel 11-14 radiates the microwaves to an outside direction of the outer panel 11-14 upon a supply of the microwaves from the output oscillator 221. In case the detection object 31 exists in the detection area 11A-14A of the electromagnetic wave radiation space, the electromagnetic waves radiated from the outer panel 11-14 are reflected or absorbed at the detection object 31. Then, an influence of the electromagnetic waves thus reflected or absorbed presents itself as a change of the output frequency of the output oscillator 221. That is, an area for detecting the detection object 31 by the outer panel 11-14 functions as a resonant circuit 51, thereby having an infinite number of resonant frequencies that change depending on whether the detection object 31 exists or not. The output oscillator 221 has a plurality of resonant frequencies in a number of two or three, if it is viewed as a structural device embodying it, that is, a microwave generating device 52.

Here, the oscillating frequency connecting integrally the resonant circuit 51 and the microwave generating device 52 is a frequency close to each other. Therefore, the oscillating frequency of the resonant circuit 51 and the oscillating frequency of the output oscillator 221 attract each other. Consequently, the both member are to oscillate at a common specific resonant frequency.

That is, a deemed circuit 50 having the common specific resonant frequency is formed by the resonant circuit 51 radiating the microwaves from the outer panel 11-14 as the antenna and the microwave generating circuit 52 composed of the output oscillator 221 outputting the frequency of a sufficiently short wavelength in relation to the size of the outer panel 11-14.

The microwaves outputted from the output oscillator 221 and radiated from the outer panel 11-14 are reflected or absorbed at the detection object 31. With respect to the existence of the detection object 31 in this deemed circuit 50, the electromagnetic waves radiated from the outer panel 11-14 are reflected or absorbed at the detection object 31 and it result is presented as a change of the output frequency of the output oscillator 221. The detection of the detection object 31 serves to obtain an existence, a nonexistence, a moving speed, a dimension or the like of the detection object 31 by detecting the change such as a shift of the oscillating frequency, a change of the amplitude of the frequency or the like of the output oscillator 221.

As described before, when the microwaves area radiated from the outer panel 11-14, if the detection object 31 comes near there, the outer panel 11-14 and the detection object 31 form the deemed circuit 50 that is deemed as a cavity resonant circuit having them function as the antennas to each other. In this deemed circuit 50, the detection area 11A-14A becomes a two-dimensional area where the microwaves outputted from the output oscillator 221 and radiated from the outer panel 11-14 are reflected or absorbed at the detection object 31 and react to be the shift of the oscillating frequency or the amplitude of the specific frequency of the output oscillator 221. In the same manner, the electromagnetic wave radiation space also becomes a three-dimensional space where the microwaves are radiated if the detection area 11A-14A is grasped three-dimensionally. Accordingly, any of the electromagnetic wave radiation spaces of the detection areas 11A-14A, which describe the embodiment of the present invention, means an area that is capable of detecting the detection area 31.

On the other hand, the time-base generator 22 is a circuit in which the output frequency is easy to change or that outputs a stable frequency by a PLL circuit or the like. The time-base generator 22 is an oscillator that oscillates stable microwaves composed of a specific frequency (fo) that is free from being affected by the state change of the electromagnetic wave radiation space. Normally, the time-base generator 22 downconverts the output frequency of the output oscillator 221 by the mixer 23.

Moreover, a wave detector 32 detects a signal passed through the bandpass filter 24 and makes it into an amplitude of a predetermined frequency. The bandpass filter 24 and the wave detector 32 may be embodied in any way as long as they demodulate only the specific mixing frequency (f+fo). Therefore, in practicing the present invention, a sequence of a signal processing of the bandpass filter 24 and the wave detector 32 is not limited or no object. It may be any one as long as it mixes the frequency change by the time-base generator (fo), takes out the specific frequency through the bandpass filter 24, detects the taken-out frequency by the wave detector 32 and converts it into the amplitude change.

Moreover, the recognition circuit 27 carries out recognition and distinguishment as the shift of the frequency passed through the wave detector 32 that detects the signal of the frequency passed through the bandpass filter 24 ad the amplitude (voltage) change of that specified frequency. The detected frequency shift and the amplitude change of the specified frequency serves to measure the shift of the frequency and the amplitude of the specified frequency corresponding to the distance, the dimension or the like of the detection object 31 as a standard voltage in advance, thereby estimating the distance, the dimension and the moving speed based upon the frequency shift and the standard voltage. Therefore, more concretely, the recognition circuit 27 is composed of an F-V converter, a FFT or the like and a memory or the like, while having a memory map in which the shift of the frequency passed through the mixer 23, the change of the amplitude of the same frequency or the like. Thus, the recognition circuit 27 determines the change of the electromagnetic wave radiation space by comparison with an information of the same memory map. However, if the band of the bandpass filter 24 is made narrow, it is possible to detect in binary (ON, OFF) the existence and the nonexistence of the detection object 31 passed through the bandpass filter 24 when the detection object 31 resides in the detection area 11A-14A and when it does not reside there.

Since the output of the output oscillator 221 is subject to the state change of the detection area 11A-14A as the electromagnetic wave radiation space and its frequency changes, a directional coupler 28 inputs only the changing frequency into the mixer 23 so as not to have an influence up to the output of the time-base generator 22.

That is, at this time, the informations of the shift of the frequency and the amplitude of the frequency such as a human, an object, their size or the like are compared and referenced with the informations of the shift and the amplitude of the standard frequency inside the recognition circuit 27, thereby estimating and determining the distance to the detection object 31, the size of the detection object 31 and the moving speed of the detection object 31. This method can discriminate even the change when the door of the vehicle 1 is automatically opened or closed with the access of the human or the object.

The present embodiment of the proximity sensor constructed as above operates as follows.

The output of the output oscillator 21 radiates the microwaves from the outer panel 11-14 to the electromagnetic wave radiation space with the outer panel 11-14 of each door of the vehicle 1 as the antenna. At this time, the outer panel 11-14 and the detection object 31 form the deemed circuit 50 that is taken as the cavity resonant circuit with them acting as the antennas to each other. The output of the deemed circuit 50 taken as the cavity resonant circuit presents itself as the frequency (f) obtained from the output of the output oscillator 221 as one frequency change. The obtained frequency (f) and the frequency (fo) obtained from the time-base generator 22 are mixed with the frequency obtained from the time-base generator 22 so as to be down-converted in the mixer 23. Then, the shift of the frequency passed through the mixer 23 and the change of the amplitude of the same frequency are checked by the recognition circuit 27 so as to detect the existence, the nonexistence, the moving speed, the size or the like of the detection object 31.

Thus, the deemed circuit 50 taken as the cavity resonant circuit of the microwaves corresponding to a relative distance between the detection object 31 and the outer panel 11-14 can be deemed as the resonant circuit 51 of the electric field intensity (magnetic field) between the outer panel 11-14 and it since the mutual influence of the electric field and the magnetic field of the microwaves is larger than the influence of the electrostatic capacity of the detection object 31. Consequently, the deemed circuit 50 is hard to be affected by the electrostatic capacity of the detection object 31 in the electromagnetic wave radiation space.

Even if the frequency of the output oscillator 221 is radiated as the microwaves from the outer panel 11-14, there is not generated any variation of the frequency in the output oscillator 221 in case there is no detection object 31 generating reflection or absorption in the electromagnetic wave radiation space.

In contrast, if the detection object 31 comes near the outer panel 11-14, the microwaves are reflected or absorbed at the detection object 31, so that the state of the electromagnetic wave radiation space changes. At this time, the frequency component (wavelength component), which corresponds to the distance of the reflected waves returning to the outer panel 11-14 from the detection object 31, is a frequency close to the frequency of the output oscillator 221 outputted from the outer panel 11-14. Then, there takes place a state in which two kinds of frequencies exist. However, in fact, they are coupled with each other so as to be changed into one frequency (f) as the frequency of a resonant phenomenon. This frequency change and the output frequency (fo) of the time-base generator 22 are introduced into the mixer 23 so as to be mixed in the mixer. Such mixed frequency becomes a mixing frequency (|f+fo|) and a mixing frequency (|f−fo|). Concerning the mixing frequencies (|f+fo|, |f−fo |) from the mixer 23, the frequency of the variation difference, i.e. the mixing frequency (f+fo) or the mixing frequency (f−fo) is taken out through the bandpass filter 24. Then, the taken-out mixing frequency (f+fo) or the mixing frequency (f−fo) is detected by the wave detector (S-curve characteristic device) 32 so as to detect the amplitude of the mixing frequency (f+fo) or the mixing frequency (f−fo). The existence or nonexistence, the moving speed, the size or the like of the detection object 31 is detected by checking by the recognition circuit 27 the shift of the mixing frequency (f+fo) or the mixing frequency (f−fo) passed through the mixer 23 and the change of the amplitude of such frequency.

The output oscillator 221 used in the present embodiment is made into the dielectric oscillator that oscillates the microwaves of the working frequency of 300 MHz to 300 GHz. Consequently, it can generate the microwaves at low costs and the entirety of the device can be low-priced.

Therefore, if it is combined with a well-known smart key, it is possible to open the door when a driver of the vehicle 1 comes near the vehicle 1. At this time, the electronic control circuit can detect a human hiding at an opposite side to the driver side door, for example. Then, it is possible to warn it to the driver. Moreover, the electronic control circuit 2 makes the driver side door not opened, while alarming a trouble as desired. Of course, the electronic control circuit 2 can make only the driver side door opened, while hurrying the driver to get in, thereafter making all the doors in locked state. That is, it is possible to decide an existence of a third person near the vehicle 1 by discriminating him or her from an owner of the smart key, thereby warning it to the driver. In addition, the electronic control circuit 2 can open the door without any key operation when a human comes near, while closing it when the human gets away, by discriminating it from the smart key.

Seventh Embodiment

The aforementioned first embodiment to the sixth embodiment of the proximity sensors 10 describe the examples using the UWB oscillator 21 having the wide band of the output frequency or the output oscillator 121 feeding back actively to the oscillating frequency and generating the change in the oscillating frequency. However, the present invention can be embodied by making into an oscillator the outer panel 11-14 acting as the antenna, the detection area 11A-14A set at an outer periphery of the outer panel 11-14 and a space determining whether the detection object 31 to be sensed exists or not.

Figure 9:
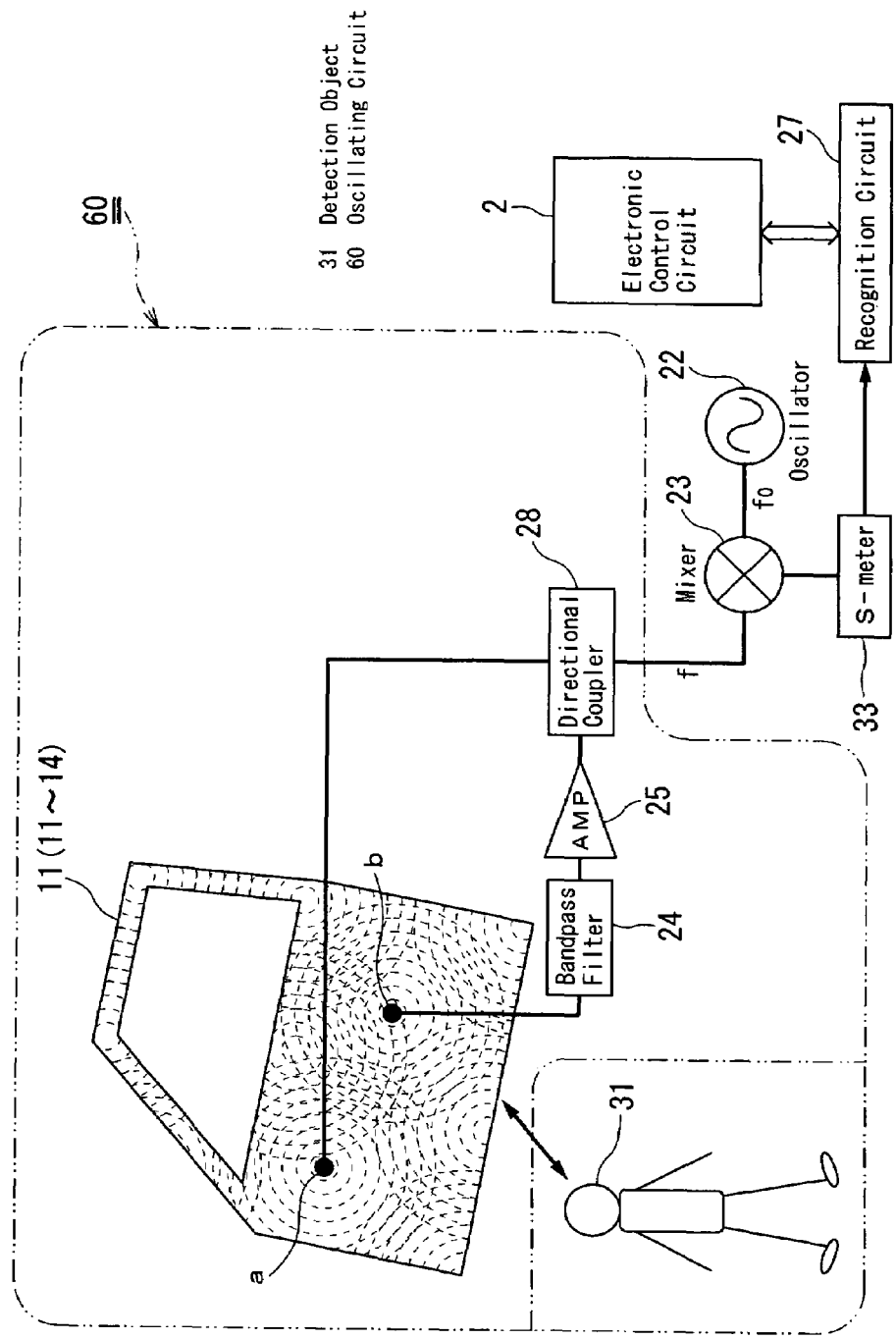
FIG. 9 is a functional block diagram of a proximity sensor of a seventh embodiment of the present invention.

FIG. 9 is a functional block diagram of a proximity sensor of a seventh embodiment of the present invention.

A bandpass filter 24, a high-frequency amplifier 25 and a directional coupler 28 are connected in series from a receiving point "b" on the outer panel 11-14 made of an electrical conductor such as a metal plate or the like of each door of the vehicle 1 to a feeding point "a".

A frequency of a specific frequency range of microwaves passed through the bandpass filter 24 from the receiving point "b" of the outer panel 11-14 is amplified by the high-frequency amplifier 25. A specified frequency supplied to the feeding point "a" and then received at the receiving point "b" of the outer panel 11-14 is amplified by the high-frequency amplifier 25 and fed back to the feeding point "a" so as to come into an oscillating state.

That is, a white noise exists at the receiving point "b" by a noise from an external environment or the like or a thermal noise of the high-frequency amplifier 25. Therefore, if the feedback is done under such a condition that a gain is larger than "1" based upon the noise and that a phase of a signal becomes 360 degrees, it becomes the oscillating state.

Here, the directional coupler 28 enables an output from the bandpass filter 24 to the feeding point "a" through the high-frequency amplifier 25, thereby detecting the frequency received at the receiving point "b" of the outer panel 11-14. The mixer 23 mixes a frequency (f) in a feedback state generated by the directional coupler 28 and a frequency (fo) obtained from the oscillator 22. Specifically, the mixer 23 obtains a mixing frequency (mf+nfo) by mixing. A S-meter (signal meter) 33 detects an output (an amplitude of a specific frequency and a shift of a frequency) of the mixing frequency (f+fo) with the frequency (f) in the feedback state generated by the directional coupler 28. As a result, the change of the frequency (f) in the feedback state generated by the directional coupler 28 is mixed by an oscillator (fo), thereby detecting a change of thus taken-out frequency or a change of waves by the S-meter 33.

Here, the present embodiment of the proximity sensor 10 sets the feeding point "a" and the receiving point "b" on the outer panel 11-14. Then, the proximity sensor 10 amplifies the frequency obtained from the receiving point "b" and feed the frequency back to the feeding point "a". Thus, the proximity sensor 10 constitutes an oscillating circuit 60 that oscillates the microwaves at a frequency of sufficiently short wavelength with the outer panel 11-14 as the antenna. Moreover, a resonator is constituted by the outer panel 11-14 acting as the antenna and the detection area 11A-14A as the electromagnetic wave radiation space around these outer panels 11 to 14.

An oscillator 22 in case of embodying the present invention detects a change of the frequency (f) of the oscillating circuit 60 that oscillates the microwaves with the outer panel 11-14 as the antenna. The oscillator 22 down-converts the frequency (f) of an oscillating frequency radiated from the outer panel 11-14.

Moreover, the S-meter (signal meter) 33 detects the change of the oscillating frequency of the mixing frequency (f+fo) with the frequency (f) in the feedback state generated by the directional coupler 28. As a result, the change of the frequency (f) in the feedback state generated by the directional coupler 28 is mixed by the oscillator (fo). Then, thus taken-out frequency is detected by the S-meter 33.

At this time, the frequency of the resonator formed by the outer panel 11-14 acting as the antenna and the detection area 11A-14A as the electromagnetic wave radiation space around them is set such that it becomes not less than a predetermined threshold value by monitoring the S-meter 33 when there is no detection object 31. However, if the detection object 31 exists, the oscillating frequency changes between the outer panel 11-14 and the detection area 11A-14A due to the change of the state of the detection area 11A-14A as the electromagnetic wave radiation space. Consequently, the output of the S-meter 33 becomes less than the predetermined threshold value.

As such, the mixer 23 mixes the frequency (f) in the feedback state generated by the directional coupler 28 and the frequency (fo) obtained from the oscillator 22 for down-conversion. Then, the output of the specific frequency is measured by the S-meter 33. The change of the output (shift of the frequency and amplitude of specific frequency) obtained by monitoring the S-meter 33 is detected as a frequency change, since there takes place a mutual coupling of the antennas made of the detection object 31 and the outer panel 11-14 deemed as the antennas in case the detection object comes near or exists there.

In addition, the recognition circuit 27 recognizes the output such as the shift of the frequency passed through the bandpass filter 24, the amplitude of the specific frequency or each frequency or the like as a change of a state of the detection area 11A-14A as the electromagnetic wave radiation space by use of a signal passed through the S-meter 33. Thus detected change of the frequency serves for detection of a distance, a dimension or the like by measuring beforehand a state corresponding to the distance, the dimension or the like as a standard frequency pattern information so as to estimate the distance, the dimension or the like based upon the standard frequency pattern. Moreover, such detected content may be a moving speed by a temporal change of the standard frequency pattern. At this time, the standard frequency pattern such as a human, an object, a size of the like is determined by comparing and referencing their properties with data of the standard frequency pattern, which maps the frequency, the size of the amplitude, their changing speed or the like, inside the recognition circuit 27. This judging method can differentiate the change when the door is automatically opened and closed from an access state of a human or an object that stands still or is moving.

Then, the oscillator 22, the mixer 23, the bandpass filter 24, the high-frequency amplifier 25, the directional coupler 28 and the S-meter 33 constituting the present embodiment of the proximity sensor are built in between the outer panel 11-14 of each door of the vehicle 1 and the inner panel (not shown). The output of the S-meter 33 is inputted into the recognition circuit 27 and an electronic control circuit 2. The electronic control circuit 2 is made of a microcomputer that executes an obstacle detecting device of a door opening/closing system in the present embodiment.

As described above, the present embodiment of the proximity sensor 10 has the oscillating circuit 60 oscillating the microwaves at the frequency of the sufficiently short wavelength with the outer panel 11-14 as the antenna by setting the feeding point "a" and the receiving point "b" on the outer panel 11-14 and amplifying the frequency obtained from the receiving point "b" so as to feed the same frequency back to the feeding point "a", while being composed of the bandpass filter 24 making the frequency obtained from the receiving point "b" into a specific frequency range and the high-frequency amplifier 25 amplifying and feeding back the frequency of the frequency range to the feeding point "a", the directional coupler 28 connected to a route from the receiving point "b" to the feeding point "a" so as to detect the oscillating state of the oscillating circuit 60, the mixer 23 mixing and detecting the feedback state generated by the directional coupler 28 by inputting the down-converting frequency, and the recognition circuit 27 recognizing the change of the detection area 11A-14A by the frequency passed through the mixer 23.

Accordingly, the oscillating circuit 60 with the antenna made of the outer panel 11-14 makes the frequency of the specific frequency range from the receiving point "b" of the outer panel 11-14 via the bandpass filter 24. Then, the frequency of that frequency range is amplified by the high-frequency amplifier 25 and supplied to the feeding point "a" of the outer panel 11-14, thereby oscillating the microwaves. The electromagnetic waves are radiated from the outer panel 11-14 to the detection area 11A-14A. Thus, it becomes a specific frequency state radiated from the outer panel 11-14 or a resonant state at a plurality of specific frequencies depending on a relation between the detection area 11A-14A and the outer panel 11-14. Even if the oscillating frequency of the oscillating circuit 10 is radiated from the outer panel 11-14, there is not generated any frequency variation in the oscillating frequency in case there is no detection object 31 generating reflection or absorption in the detection area 11A-14A.

However, if the detection object 31 such a human comes near the detection area 11A-14A as the electromagnetic wave radiation space, the resonator of the microwaves is formed between the outer panel 11-14 and it. Then, the resonant state of the frequency radiated from the outer panel 11-14 changes. That is, if the detection object 31 such as a human comes near the outer panel 11-14, the electric field of the detection area 11A-14A is reflected or absorbed at the detection object 31, so that the field of the electromagnetic wave radiation space changes. The change of the filed of the electromagnetic wave radiation space is detected as the change of the frequency by the directional coupler 28. Then, it is inputted into the mixer 23 together with the down-converting frequency so as to recognize the change of the detection area 11A-14A by the frequency passed through the mixer 23.

This oscillating frequency of the oscillating circuit 60 makes the feedback state generated by the directional coupler 28 mixed by the mixer 23 that inputs the down-converting frequency, thereby determining the change of the detection area 11A-14A by the recognition circuit 27 based upon the frequency passed through the mixer 23. That is, the frequency of the oscillating circuit 60 is taken out through the directional coupler 28 so as to determine a pattern of the existence of that oscillating frequency (signal meter output). Thus detected frequency pattern serves for detection of the distance, the size or the like of the detection object 31 on the basis of the standard frequency pattern by storing beforehand the change of the frequency corresponding to the distance, the size or the like of the detection object 11A-14A as the standard frequency pattern and comparing the known standard frequency pattern with the detected frequency.

When the detection object 31 does not reside in the field of the detection area 11A-14A, it is possible to set it not less than a threshold value of the specific oscillating frequency radiated from the outer panel 11-14. Then, when it becomes less than the threshold value of the specific oscillating frequency radiated from the outer panel 11-14, the detection object 31 can be detected as the change of the field of the detection area 11A-14A.

Moreover, the recognition circuit 27 normally recognizes the change of the detection area 11A-14A as the electromagnetic wave radiation space as the change of the oscillating frequency. The recognition circuit 27 detects the distance, the size or the like by comparison with the standard frequency pattern corresponding to the known distance, size or the like. Therefore, the recognition circuit 27 may be any one composed of an analog circuit or a digital circuit.

Particularly, when the detection object 31 resides in the detection area 11A-14A as the electromagnetic wave radiation space, the outer panel 11-14 and the detection object 31 are deemed as the cavity resonator between the mutual antennas of the outer panel 11-14 and the detection object 31 as the antennas. With such configuration, the mutual influence of the electric field and the magnetic field of the electromagnetic waves becomes larger, so that it becomes hard to be affected by the electrostatic capacity of the detection object 31 in the detection area 11A-14A. Consequently, the detection accuracy improves.

Moreover, the present embodiment of the antenna is made of the outer panel 11-14 of the door of the vehicle 1. Conditions of the outer panel 11-14 change in accordance with opening and closing of the door and there occurs a state change of the detection area 11A-14A. However, in such case, it is possible to set the detection area 11A-14A in any conditions by the frequency radiated from the oscillator 22.

As described above, the aforementioned embodiment of the proximity sensor 10 has the oscillating circuit 60 oscillating the microwaves at the frequency of the sufficiently short wavelength with the outer panel 11-14 as the antenna by setting the feeding point "a" and the receiving point "b" on the outer panel 11-14, amplifying the frequency obtained from the receiving point "b" and feeding back the same frequency to the feeding point "b". The proximity sensor 10 detects the change of the detection area 11A-14A as the change of the frequency obtained from the oscillating circuit 60.

Accordingly, the oscillating circuit 60 oscillates with the outer panel 11-14 used as the antenna. Then, the electromagnetic waves are radiated from the outer panel 11-14 to the detection area 11A-14A. Thus, there takes place a resonant state of the specific frequency state radiated from the outer panel 11-14 by the relation between the detection area 11A-14A and the outer panel 11-14. Even if the oscillating frequency of the oscillating circuit 60 is radiated from the outer panel 11-14, there is generated no frequency change in the oscillating frequency in case the detection object 31 causing the reflection or absorption does not exist in the detection area. However, if the detection object 31 such as a human comes near the detection area 11A-14A as the electromagnetic wave radiation space, the cavity oscillator of the microwaves are formed between the outer panel 11-14 and the detection object 31 as the antenna, so that the resonant state of the frequency radiated from the outer panel 11-14 changes. That is, if the detection object 31 such as a human comes near the outer panel 11-14, the electric field in the detection area 11A-14A is reflected or absorbed at the detection object. As a result, the field of the electromagnetic wave radiation space changes. It is possible to detect an access of the detection object 31 by sensing it.

Here, the outer panel 11-14 may be any electrically conductive body that is integrally or separably mounted on the mounting object. Moreover, the detection area 11A-14A set at the outside of the outer panel 11-14 is normally arranged at a desired distance within 1 meter though it is decided by the outer panel 11-14, the wavelength of the microwaves or the like. The oscillating circuit 60 may be modified as long as it can oscillate the microwaves by setting the feeding point "a" and the receiving point "b" on the outer panel 11-14, amplifying the frequency obtained from the receiving point "b" and feeding back the same amplified frequency to the feeding point "a". Furthermore, the detection of the change of the aforementioned detection area 11A-14A as the change of the frequency obtained from the oscillating circuit 60 is the detection of the change of the detection object 31 like a human or the like near the outer panel 11-14 as the change of the frequency obtained from the oscillating circuit 60. The change of the frequency may be detected as a pattern or may be determined by comparison with a fixed threshold value.

Consequently, the oscillating frequency of the microwaves changes in accordance with the detection area 11A-14A and the detection object 31 there, the mutual influence of the electric field and the magnetic field of the electromagnetic waves is large. As a result, it is hard to be affected by the electrostatic capacity of the detection object 11A-14A in the electromagnetic wave radiation space.

Particularly, in the present embodiment of the proximity sensor 10, the microwave oscillating circuit 60 can be deemed as the cavity resonator between the detection area 11A-14A as the electromagnetic wave radiation space and the detection object 31. Therefore, the mutual influence of the electric field and the magnetic field of the electromagnetic waves becomes larger, so that it becomes hard to be affected by the electrostatic capacity of the detection object 31 in the detection area 11A-14A. Thus, the detecting accuracy improves. Moreover, the present embodiment of the proximity sensor 10 enables the detection that is free from the influence by the atmosphere such as the humidity, the temperature, the moisture, the pressure or the like in the detection area 11A-14A, in comparison with the conventional type of electrostatic capacity sensing system, by use of the microwaves of the working frequency of 300 MHz to 300 GHz. Thus, the device becomes low-priced. Furthermore, the present embodiment of the proximity sensor 10 enables the detection even if the detection object 31 is not moving in the detection area 11A-14A, in contrast with the Doppler detection using the microwaves. Consequently, the present embodiment of the proximity sensor 10 makes easy the detection at close range and can perform the detection of the state while being manufacturable at low costs.

Specifically, the present embodiment of the proximity sensor 10 takes out the oscillating frequency of the microwaves trough the directional coupler 28 and determines the pattern of its oscillating frequency. This detected oscillating frequency pattern is stored as the standard frequency pattern corresponding to the distance, the size of the like of the detection object and compared with the data detected through the directional coupler 28. Then, the distance, the size or the like including its speed, if necessary, of the detection object is detected based upon the standard frequency pattern.

At this time, when the detection object 31 does not exist in the detection area 11A-14A, if a specific oscillating frequency radiated from the outer panel 11-14 is simply made into a specific threshold value, the sensing of the detection object is carried out by ON and OFF detection as the change of the field of the detection area based upon the detected frequency changing from the threshold value.

Then, if the working frequency of the microwaves is 300 MHz to 300 GHz, it is possible to realize detection that is not affected by the atmosphere such as the humidity, the temperature, the moisture, the pressure or the like of the detection area 11A-14A. Consequently, the device becomes low-priced. As a result, the present embodiment of the proximity sensor 10 makes easy the detection at close range and can detect the state while being manufacturable at low costs.

The aforementioned embodiment of the proximity sensor forms the microwave circuit by the detection area 11A-14A made of the electromagnetic wave radiation space accompanying the change of the humidity, the temperature and the barometric pressure and the outer panel 11-14 as the electrically conductive member or the existing detection object 31. If the detection object 31 exists in the detection area 11A-14A, the propagation state of the outer panel 11-14 as the electrically conductive member acting as the antenna changes. Consequently, the microwave circuit formed by the detection object 31 in the detection area 11A-14A and the outer panel 11-14 as the electrically conductive member can detect the existence and the nonexistence of the detection object 31 by the change of eigenvalue of the radio wave propagation of each of the wavelength components (frequency components) as its propagation state. Here, the microwave circuit sensing the detection object in the detection area can be oscillated by self-excitation by amplifying its vibration so as to feed it back to the electrically conductive member. Moreover, the microwave circuit may be a circuit that is oscillated by separate excitation by exciting and oscillating the electrically conductive member by use of the microwaves of a specific frequency. Furthermore, the microwave circuit seeks the change of the eigenvalue of the radio wave propagation of the electrically conductive member acting as the antenna. Therefore, the microwave circuit may be a circuit configuration having the UWB oscillator supplying the wideband frequency for the supply of the energy from the outside.

Specifically, the embodiment of the present invention may have the outer panel 11-14 as the electrically conductive member mounted integrally or separably on the mounting object, the detection area 11A-14A made of the electromagnetic wave radiation space arranged at the outside of the outer panel 11-14 while accompanying the change of the humidity, the temperature and the barometric pressure, and the microwave circuit making the outer panel 11-14 act as the antenna and radiate the microwaves having the sufficiently short wavelength relative to the size of the outer panel 11-14 so as to detect the existence of the detection object 31 residing in the space inside the detection area 11A-14A by the outer panel 11-14 as the change of the eigenvalue of the radio wave propagation, thereby detecting the change of the eigenvalue of the radio wave propagation by the microwave circuit as the change of the detection area.

Accordingly, the microwave circuit, which is largely affected mutually by the electric field and the magnetic field of the electromagnetic waves, is formed between the detection object 31 in the detection area 11A-14A as the electromagnetic wave radiation space and the outer panel 11-14. Then, the frequency is propagated corresponding to the detection area 11A-14A and the detection object 31. If the detection object 31 does not exist at the outside of the outer panel 11-14, the fixed value of the radio wave propagation such as a transfer function is uniquely decided in accordance with the antenna characteristics. Particularly, by the circuit having the working frequency of the microwaves, the mutual influence of the electric field and the magnetic field of the electromagnetic waves is large. Consequently, it becomes hard to be affected by the electrostatic capacity of the detection object 31 in the detection area 11A-14A. As a result, it is possible to provide the detection that is free from the influence of the atmosphere such as the humidity, the temperature, the moisture, the pressure or the like of the detection area 11A-14A in comparison with the conventional type of the electrostatic capacity sensing system. Therefore, the device is low-priced and the detection accuracy improves. Moreover, the detection is possible even if the detection object is not moving in the detection area 11A-14A, in contrast to the detection of the Doppler frequency. Furthermore, there are many radiatable resonant frequencies on the outer panel 11-14 acting as the antenna and such propagation state change is detected. Consequently, it can be practiced without any special detailed examination of the property of the outer panel 11-14.

Therefore, the embodiment of the present invention can be a proximity sensor that has no malfunction due to an environmental change or an aging deterioration caused by rain or a change of a humidity around the detection object, that can be small-sized while being low-priced with high accuracy, that enables detection even if the detection object stands still, and that can speed up the detection speed and is applicable to one composed of a metal such as the vehicle.

APPLICABILITY IN INDUSTRY

The present invention enables the detection of the detection object 31 at close range without influence of the atmosphere such as the humidity, the temperature, the moisture, the pressure or the like of the electromagnetic wave radiation space. Consequently, the invention is usable as a sensor for detection at each kind of short distance in addition to the sensors such as the obstacle detection device for the door opening/closing system, the security system, the keyless entry system or the like, since it is not affected if a weather condition changes such as a humidity change in the air in the natural world, in comparison with the conventional type of the electrostatic capacity detecting system.

Here, such kind of proximity sensor 10 of the embodiment in the present invention is applicable to a shower toilet sensor or the like that detects the movement or existence of the human body in addition to the vehicle. Its use is not limited to the vehicle. For example, it can be used for general purpose such as the shower toilet sensor that detects the movement or existence of the human body. At this time, the outer panel 11-14 may be to act as the antenna, for example. The other constitution is not different from the aforementioned embodiments. Moreover, the outer panel 11-14 integrally or separably mounted on the mounting object is not limited to a planar panel. It may have a shape obtained by machining a band-shaped or linear shaped member.

Then, the proximity sensor 10 of the embodiment of the present invention may dispose the electrically conductive member such as the outer panel 11-14 on the mounting object so as to be integral or separable.

Here, even the proximity sensor 10 concretized for the general purpose may be constructed in the same way as the aforementioned embodiments and have the same function and effects. Therefore, its detailed description is omitted.

Moreover, even in case of being mounted on the vehicle 1, there is a high possibility that the present embodiment of the proximity sensor 10 detects bouncing of the detection object 31 by a front bumper while the vehicle is moving and that the detection object 31 rides on a hood. Therefore, it is possible to move up or float the hood so as to make it soft-land on the hood. Alternatively, an air-bag may be operated on the hood.

Furthermore, if the present embodiment of the proximity sensor 10 is attached to a rear bumper, it can be used as a back sonar.

In addition, if the present embodiment of the proximity sensor 10 is arranged on a seat of the vehicle, it can detect whether seated or not or a posture in seating, thereby being usable for control of moving up and down or tilting of a headrest or the like.

The invention claimed is:

1. A proximity sensor comprising:
an electrically conductive member integrally or separably mounted on a mounting object,
a detection area made of an electromagnetic wave radiation space set at an outside of the said electrically conductive member and accompanying a change of a humidity, a temperature and a barometric pressure, and
a microwave circuit making the said electrically conductive member act as an antenna and radiate microwaves of a sufficiently short wavelength relative to a size of the said electrically conductive member so as to detect an existence of a detection object residing in a space inside the said detection area as a change of an eigenvalue of a radio wave propagation, thereby detecting the change of the said eigenvalue by the said microwave circuit as a change of the said detection area,
wherein the change of the eigenvalue of the said radio wave propagation is detected by use of a mixer, which makes the frequency of the said electrically conductive member passed through a directional coupler connected to the feeding point of the UWB oscillator and a bandpass filter and thereafter amplified by an amplifying means while inputting a down-converting frequency for mixing, and a recognition circuit detecting the change of the said detection area by a frequency passed through the said mixer.

2. A proximity sensor as recited in claim 1, wherein the said microwave circuit comprises an UWB (Ultra Wide Band) oscillator supplying a wideband frequency of the microwaves radiated from the said electrically conductive member, a resonant circuit is formed between the said electrically conductive member and the said detection area and the change of the said detection area is detected based upon a difference of a propagation state of a frequency supplied from a feeding point of the said UWB oscillator.

3. A proximity sensor as recited in claim 2, wherein the change of the eigenvalue of the said radio wave propagation is detected by use of a mixer, which introduces the frequency of the said electrically conductive member from the said one or two or more receiving points arranged individually and inputs a down-converting frequency for mixing, and a recognition circuit detecting the change of the said detection area by a frequency passed through the said mixer.

4. A proximity sensor as recited in claim 2, wherein the change of the eigenvalue of the said radio wave propagation is detected by forming a resonant circuit between the said electrically conductive member and the said detection area so as to perform detection based upon a change of a propagation state of a frequency supplied from a feeding point of the said UWB oscillator as the change and a moving speed of the said detection object.

5. A proximity sensor as recited in claim 4, wherein the change and the moving speed of the said detection object is recognized by use of a mixer, which introduces the frequency of the said electrically conductive member and inputs a down-converting frequency for mixing, and a recognition circuit detecting the change and the moving speed of the said detection object by a frequency passed through the said mixer.

6. A proximity sensor comprising an electrically conductive member integrally or separably mounted on a mounting object, a detection area made of an electromagnetic wave radiation space set at an outside of the said electrically conductive member and accompanying a change of a humidity, a temperature and a barometric pressure, and a microwave circuit making the said electrically conductive member act as an antenna and radiate microwaves of a sufficiently short wavelength relative to a size of the said electrically conductive member so as to detect an existence of a detection object residing in a space inside the said detection area as a change of an eigenvalue of a radio wave propagation, thereby detecting the change of the said eigenvalue by the said microwave circuit as a change of the said detection area, wherein the said microwave circuit comprises a microwave oscillating portion forming a resonant circuit of the microwaves including the said detection area the said microwave oscillating portion comprising either of a first device and a second device, the first device including an output oscillator supplying a frequency producing the microwaves radiated from the said electrically conductive member, a mixer mixing a frequency of the microwaves obtained from the electrically conductive member and a frequency obtained from a time-base generator so as to detect a predetermined frequency, a bandpass filter selecting only a specific frequency from a frequency mixed by the said mixer and a feedback system feeding back to the said output oscillator by a frequency passed through the said bandpass filter, and the second device including a recognition circuit distinguishing the change of the said detection area by a standing wave of a frequency passed through the said bandpass filter.

7. A proximity sensor comprising:

an electrically conductive member integrally or separably mounted on a mounting object, a detection area made of an electromagnetic wave radiation space set at an outside of the said electrically conductive member and accompanying a change of a humidity, a temperature and a barometric pressure, and a microwave circuit making the said electrically conductive member act as an antenna and radiate microwaves of a sufficiently short wavelength relative to a size of the said electrically conductive member so as to detect an existence of a detection object residing in a space inside the said detection area as a change of an eigenvalue of a radio wave propagation, thereby detecting the change of the said eigenvalue by the said microwave circuit as a change of the said detection area, wherein the said microwave circuit comprises an output oscillator outputting the microwaves to the said electrically conductive member and a deemed circuit deemed as a cavity resonant circuit is formed between the said electrically conductive member and a detection object in the said detection area when the detection object resides in the detection area set at the outside of the said electrically conductive member, thereby obtaining a frequency of the said deemed circuit from the said output oscillator so as to detect the detection object in the said detection area as a change of an oscillating frequency of the said output oscillator, and further comprising, at an output side of the said output oscillator, a mixer mixing the frequency outputted from the said output oscillator and a frequency obtained from a time-base generator and a recognition circuit recognizing the detection object inside the detection area set at the outside of the said electrically conductive member.

8. A proximity sensor as recited in claim 7, wherein the said output oscillator is made of a dielectric oscillator or an LC oscillator.

9. A proximity sensor comprising:

an electrically conductive member integrally or separably mounted on a mounting object, a detection area made of an electromagnetic wave radiation space set at an outside of the said electrically conductive member and accompanying a change of a humidity, a temperature and a barometric pressure, and a microwave circuit making the said electrically conductive member act as an antenna and radiate microwaves of a sufficiently short wavelength relative to a size of the said electrically conductive member so as to detect an existence of a detection object residing in a space inside the said detection area as a change of an eigenvalue of a radio wave propagation, thereby detecting the change of the said eigenvalue by the said microwave circuit as a change of the said detection area, wherein an oscillating circuit oscillating the microwaves is made by setting a feeding point and a receiving point are set on the said electrically conductive member of the said microwave circuit and amplifying a frequency obtained from the said receiving point and feeding back the said frequency to the said feeding point, thereby detecting the change of the said detection area as a change of a frequency obtained from the said oscillating circuit.

10. A proximity sensor as recited in claim 9 comprising an oscillating circuit composed of a bandpass filter making a frequency obtained from the said receiving point of the said electrically conductive member into a specific frequency range and a high-frequency amplifier amplifying and feeding back the frequency of the said frequency range to the said feeding point, a directional coupler connected on a route from the said receiving point to the feeding point so as to detect an oscillating state of the said oscillating circuit, a mixer inputting a down-converting frequency so as to mix and detect a feedback state generated by the said directional coupler and a recognition circuit recognizing the change of the detection area by a frequency passed through the said mixer.

11. A proximity sensor as recited in claim 1, wherein said electrically conductive member is an opening/closing body mounted openably and closably on a vehicle.

* * * * *